(12) United States Patent
Chew et al.

(10) Patent No.: US 12,424,874 B2
(45) Date of Patent: Sep. 23, 2025

(54) ENERGY HARVESTING AND A RAIL MONITORING ARRANGEMENT INCORPORATING SAME

(71) Applicant: UNIVERSITY OF EXETER, Exeter (GB)

(72) Inventors: Zheng Jun Chew, Exeter (GB); Yang Kuang, Exeter (GB); Tingwen Ruan, Exeter (GB); Meiling Zhu, Exeter (GB)

(73) Assignee: UNIVERSITY OF EXETER, Exeter (GB)

( * ) Notice: Subject to any disclaimer, the term of this patent is extended or adjusted under 35 U.S.C. 154(b) by 0 days.

(21) Appl. No.: 18/262,470

(22) PCT Filed: Jan. 21, 2022

(86) PCT No.: PCT/GB2022/050166
§ 371 (c)(1),
(2) Date: Jul. 21, 2023

(87) PCT Pub. No.: WO2022/157502
PCT Pub. Date: Jul. 28, 2022

(65) Prior Publication Data
US 2024/0322597 A1 Sep. 26, 2024

(30) Foreign Application Priority Data
Jan. 21, 2021 (GB) ..................... 2100800

(51) Int. Cl.
*H02J 50/00* (2016.01)
*B61L 23/04* (2006.01)
*H02J 50/10* (2016.01)

(52) U.S. Cl.
CPC .......... *H02J 50/001* (2020.01); *B61L 23/042* (2013.01); *H02J 50/10* (2016.02)

(58) Field of Classification Search
CPC ...... H02J 50/001; H02J 50/10; H02J 2310/40; B61L 23/042
(Continued)

(56) References Cited

U.S. PATENT DOCUMENTS

| 3,964,703 | A | 6/1976 | Wilkas et al. |
| 5,333,820 | A | 8/1994 | Gilcher |

(Continued)

FOREIGN PATENT DOCUMENTS

| KR | 20170102735 A | 9/2017 |
| RU | 2370393 C1 | 10/2009 |
| RU | 2706851 C1 | 11/2019 |

OTHER PUBLICATIONS

PCT International Search Report and Written Opinion for International Application No. PCT/GB2022/050166, dated Jul. 5, 2022, 20 pages.
(Continued)

*Primary Examiner* — Hai H Huynh
(74) *Attorney, Agent, or Firm* — Hoffman Warnick LLC

(57) ABSTRACT

Disclosed is an energy harvesting arrangement for use in the harvesting of magnetic field energy from a source in the form of a rail of a railway network, the energy harvesting arrangement comprising an energy harvester arranged in proximity to the rail or a component electrically connected to the rail, and the energy harvester is electrically connected, via a power management circuit, to an electrical storage device.

16 Claims, 17 Drawing Sheets

(58) Field of Classification Search
USPC .......................................................... 701/19
See application file for complete search history.

(56) References Cited

U.S. PATENT DOCUMENTS

| | | | |
|---|---|---|---|
| 5,586,736 A | 12/1996 | Mollet | |
| 8,423,240 B2* | 4/2013 | Mian | ...................... B61L 27/57 701/19 |
| 12,116,030 B2* | 10/2024 | Mian | ..................... B61L 23/042 |
| 2006/0118678 A1* | 6/2006 | Wells, II | ................. B61L 23/00 246/121 |
| 2009/0173841 A1 | 7/2009 | Kumar et al. | |
| 2009/0326746 A1 | 12/2009 | Mian | |

OTHER PUBLICATIONS

Espe Asbjorn Engmark et al., "Towards Magnetic Field Energy Harvesting near Electrified Railway Tracks," 2020 9th Mediterranean Conference on Embedded Computing (MECO), Jun. 8, 2020, pp. 1-4.

Gao Mingyuan et al., "Self-Powered ZigBee Wireless Sensor Nodes for Railway Condition Monitoring," IEEE Transactions on Intelligent Transportation Systems, vol. 19, No. 3, Mar. 1, 2018, pp. 900-909.

GB Search Report for Application No. GB2100800.8, dated Jun. 10, 2021, 2 pages.

\* cited by examiner

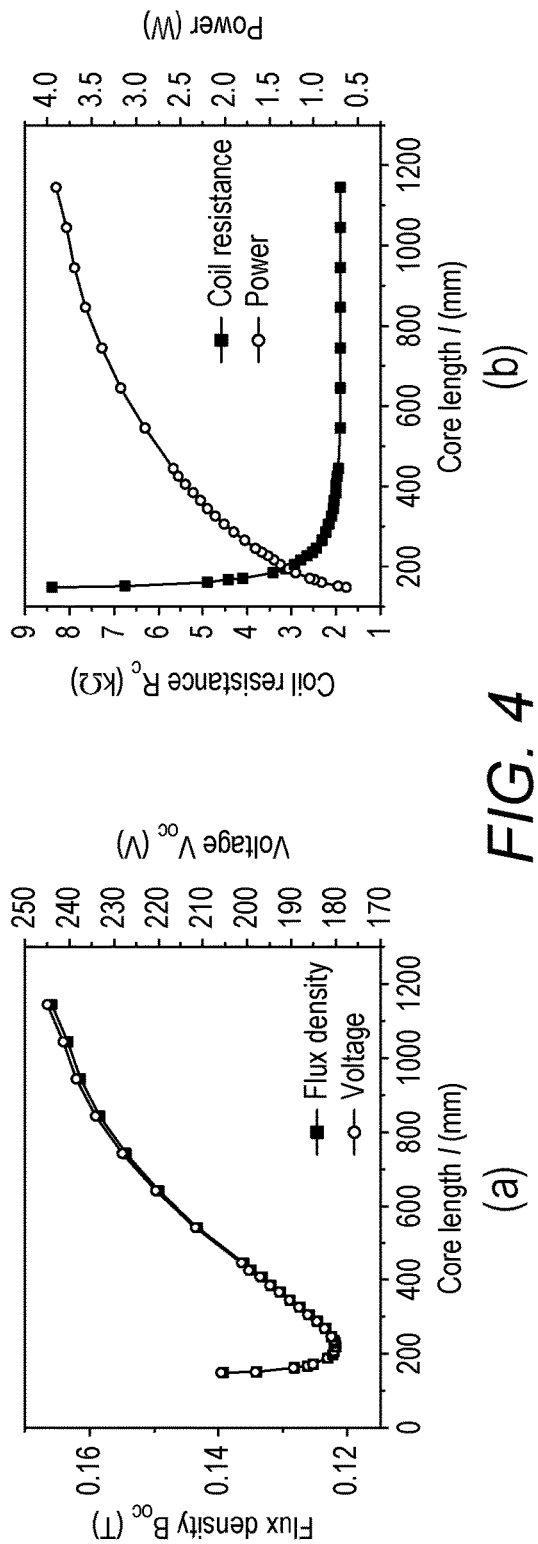
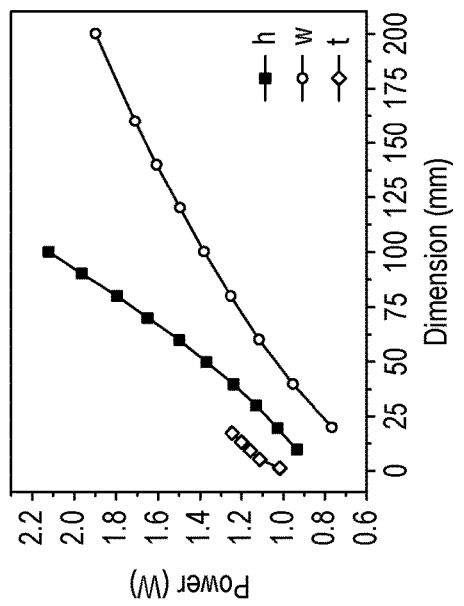
FIG. 4
FIG. 5

ENERGY HARVESTING AND A RAIL MONITORING ARRANGEMENT INCORPORATING SAME

This invention relates to energy harvesting, and in particular to the harvesting of magnetic field energy from a rail of an electrified railway network. It also relates to a monitoring arrangement incorporating such an energy harvesting scheme.

Railway networks increasingly use electrically powered locomotives rather than diesel and other fuels. It is common for the electrical power to be supplied using overhead cables, with the locomotives and/or carriages (referred to herein as trains, for convenience) associated therewith being provided with suitable pantograph arrangements supporting collectors that contact the overhead cables. The return connection is typically made via the train wheels and the rails upon which the trains are run. Whilst the use of overhead cables is fairly common, other schemes including a third rail or the like by which electrical power is supplied are also known.

A railway network typically includes a number of trackside pieces of electrical equipment which require power supplies. By way of example, it is common to include a range of sensors monitoring the condition of the rails. By monitoring the condition of the rails, maintenance can be enhanced and disruptions caused by unexpected failures reduced. Whilst the use of connections to supply networks, or the use of batteries, solar panels and the like are possible, there is a need to provide other supply schemes to allow such equipment to be supplied with electrical power, and it is an object of the invention to provide such an arrangement, and a monitoring arrangement including such a scheme.

According to the present invention there is provided an energy harvesting arrangement for use in the harvesting of magnetic field energy from a source in the form of a rail of a railway network, the energy harvesting arrangement comprising an energy harvester arranged in proximity to the rail or a component electrically connected to the rail, and the energy harvester is electrically connected, via a power management circuit, to an electrical storage device.

In an embodiment, the energy harvester comprises first and second flux collectors positioned, in use, adjacent opposite sides of the foot of the rail so that the foot of the rail is located, at least in part, laterally between the first and second flux collectors, the first and second flux collectors being interconnected by a rod around which a coil is wound, the rod extending beneath the rail, the conductor of the coil being electrically connected, via the power management circuit, to the electrical storage device, wherein the first and second flux collectors and the rod are of a magnetic material.

In an embodiment, the energy harvester comprises a coil arranged in proximity to a return wire, the return wire is either: connected from the rail to a booster transformer located alongside the rail; or connected from the rail to ground, and the coil is electrically connected, via the power management circuit, to the electrical storage device. Preferably, the coil is arranged to surround the return wire.

When an alternating current flows in the rail, the current will be concentrated at the surface and adjacent the corners of the rail profile as a result of the skin effect. In order to maximise the amount of magnetic field energy that can be harvested, it would be desirable for the harvesting arrangement to encircle the rail. However, this would prevent a train from running on the rail. By providing first and second flux collectors that are located to opposite sides of the rail, connected by a rod extending beneath the rail, a high level of magnetic field energy can be harvested without impeding the passage of a train along the rail. As a result of the skin effect, the magnetic flux density at the corners of the rail and at the foot of the rail is high, and so, whilst the level of energy that can be harvested is less than would be the case if the rail could be encircled by the harvesting arrangement, a good level of energy harvesting can be achieved.

The flux collectors are preferably of substantially planar form, and are conveniently located close to, but not in contact with, the rail.

The invention further relates to a rail monitoring arrangement for monitoring the condition of a rail, the rail monitoring arrangement comprising an energy harvesting arrangement as set out hereinbefore, a sensor operable to monitor a condition parameter associated with the rail, the sensor being arranged to be powered from the electrical storage device, a transmission arrangement whereby data acquired using the sensor can be transmitted to a remote location, and a controller operable to control the operation of the sensor and the transmission arrangement.

It will be appreciated that the electrical output generated by the energy harvesting arrangement is at its highest as a train runs over the part of the rail adjacent which the energy harvesting arrangement is installed. The timing at which sensor information is most useful is also as a locomotive is approaching and passing over the rail. The electrical storage device conveniently includes at least a first energy store and a second energy store, and the controller includes a power management function operable to connect one of the energy stores to the coil, and the other of the energy stores to the sensor and transmission arrangement. In this way, simultaneous charging and discharging of one of the energy stores is avoided, and it can be ensured that the sensor and transmission arrangement can be powered prior to the arrival of the train. The controller conveniently connects the energy store with the highest level of charge to the sensor and transmission arrangement, and the energy store with the lowest level of charge to the coil. Typically, in this manner, the energy stores will be connected, in turn, to the sensor and transmission arrangement.

The arrangement preferably further comprises a sensor operable to detect the approach of a train. By way of example, the sensor may comprise a piezoelectric sensor, a microphone or a vibration sensor. Upon detection of an approaching train, the controller powers up the sensor and transmission arrangement to allow sensor information to be recorded and transmitted to a remote location. The sensor information is preferably transmitted via a Bluetooth communications link (where transmission over a relatively short distance is required) or LoRa (where transmission over a greater distance is required) to a communications hub forming the remote location.

The invention will further be described, by way of example, with reference to the accompanying drawings, in which:

FIGS. 1$a$, 1$b$ and 1$c$ are diagrammatic representations of an energy harvesting arrangement in accordance with embodiment of the invention;

FIG. 4 illustrates the effects of the magnetic core length l on the performance, with (a) showing coil inductance and open-circuit flux density and (b) coil resistance and power;

FIG. 5 illustrates the effects of the dimensions of the flux collectors on the power output of the harvester;

Figure 7:
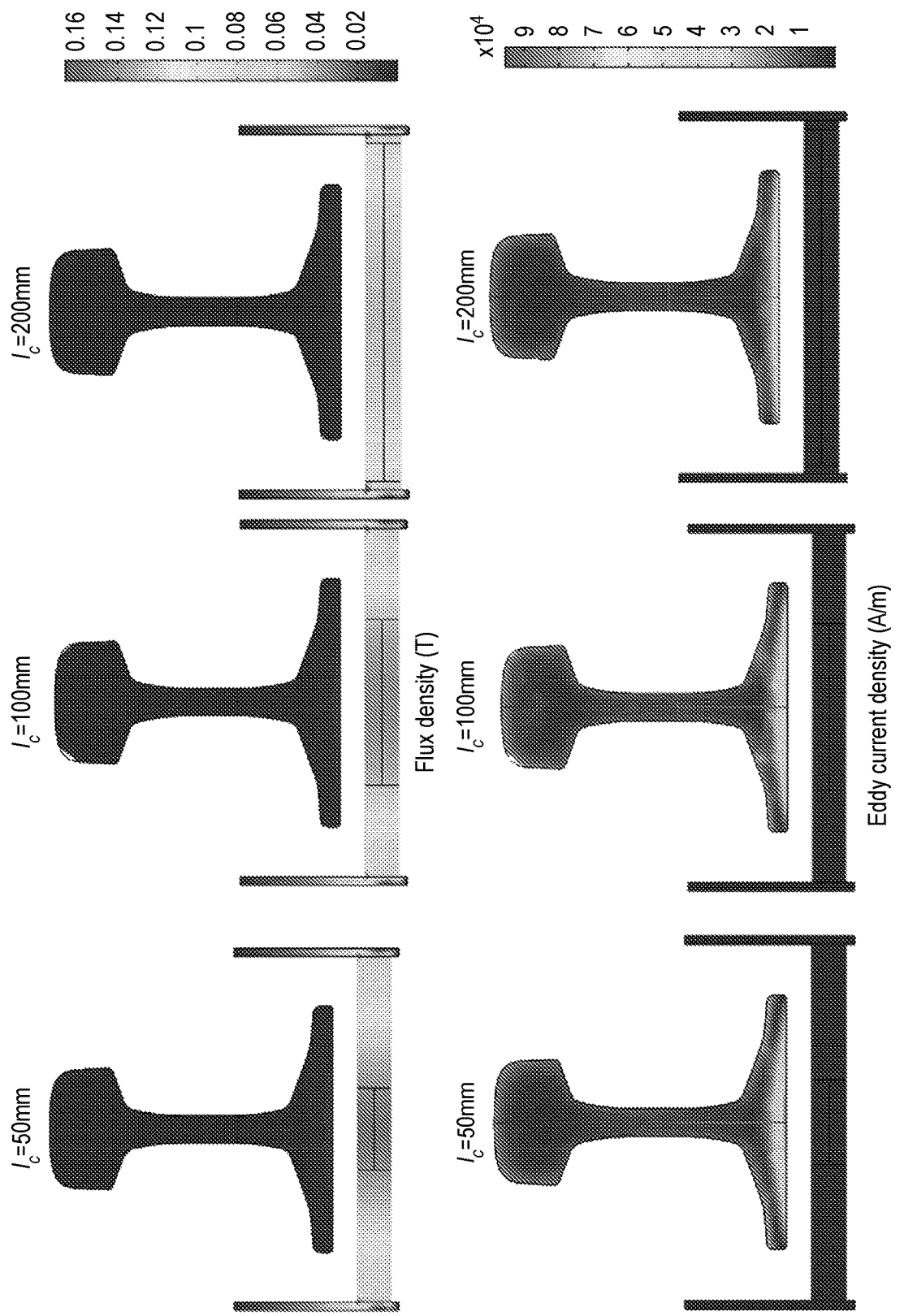
Figure 8:
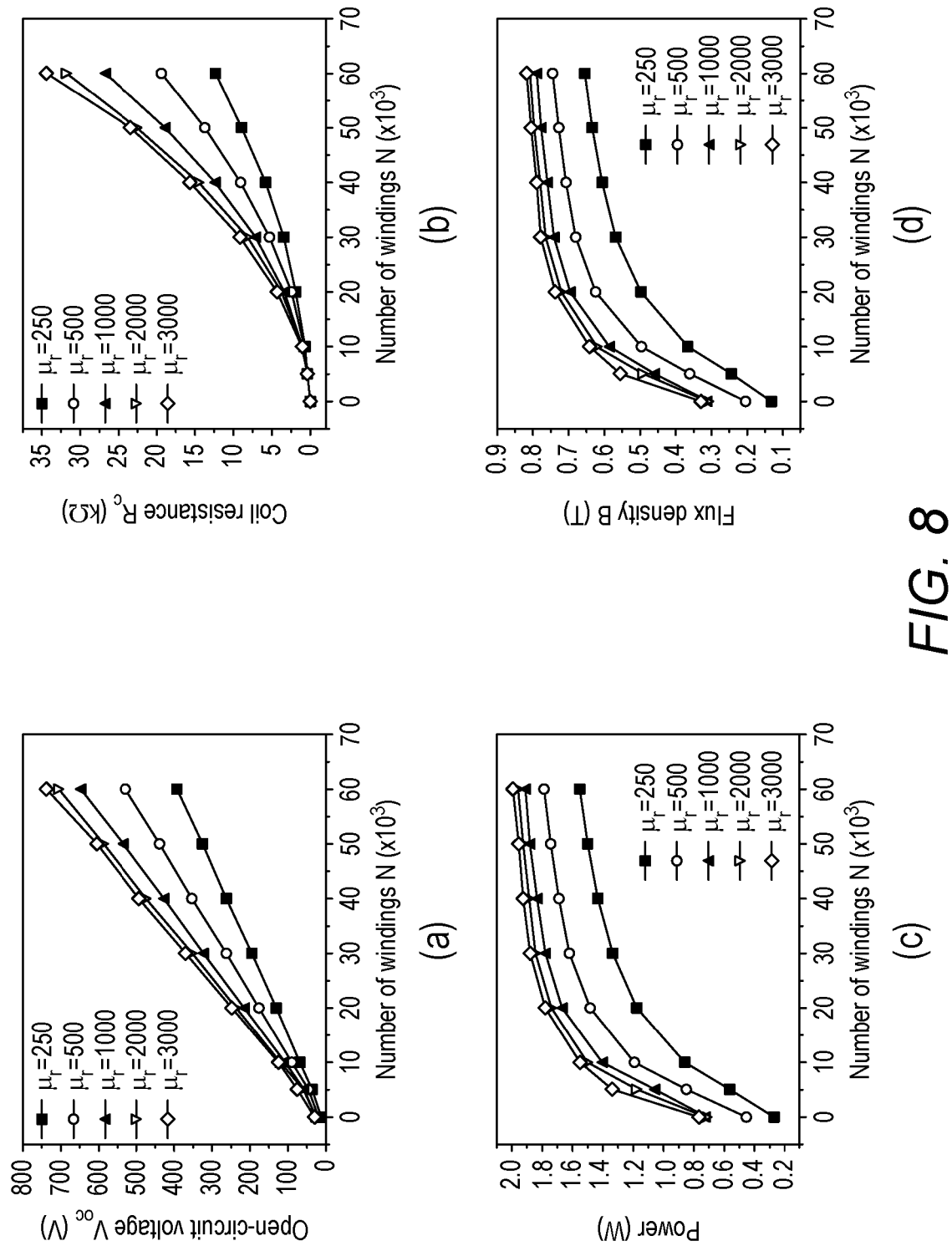
Figure 9:
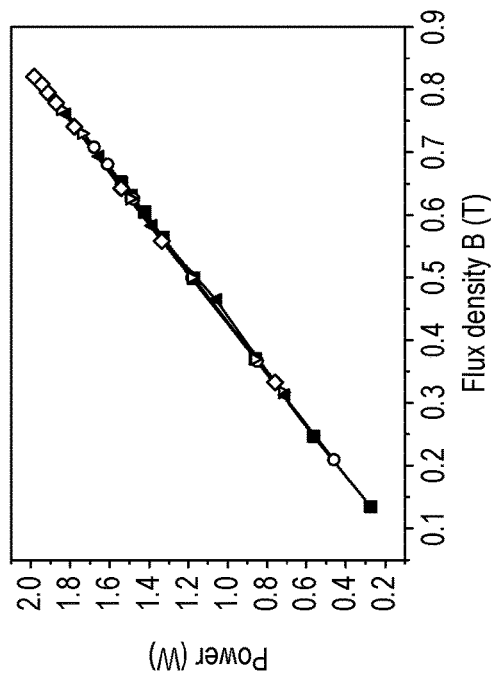
Figure 10:
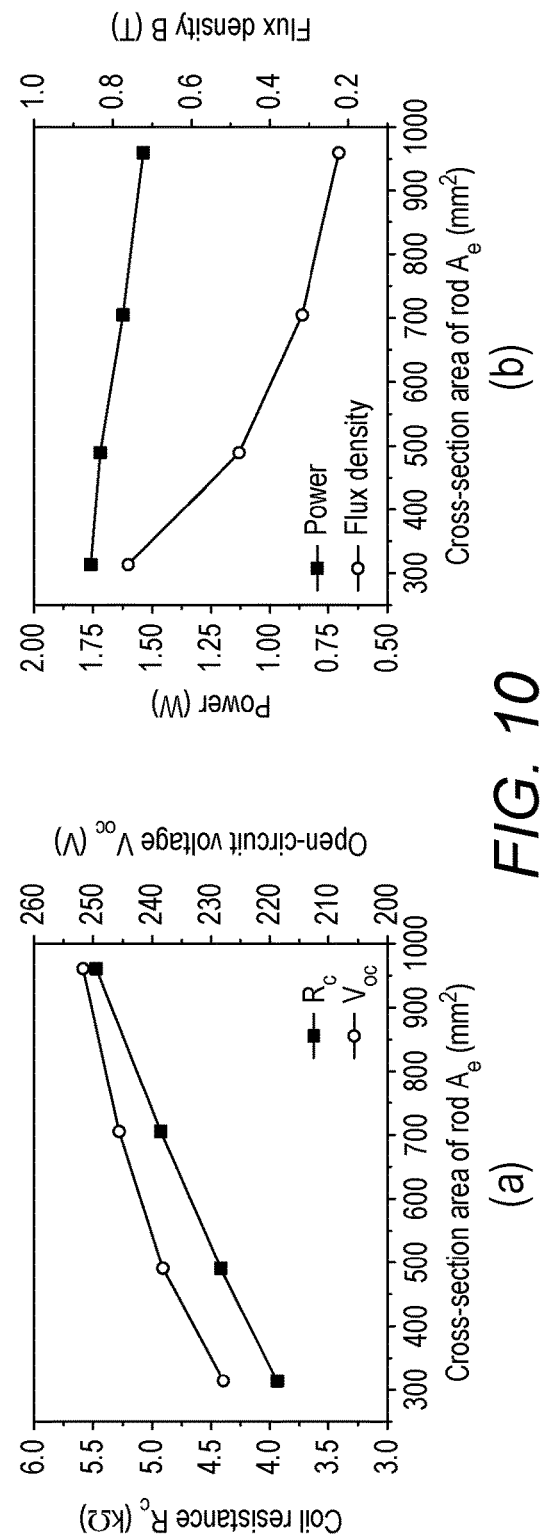
Figure 11:
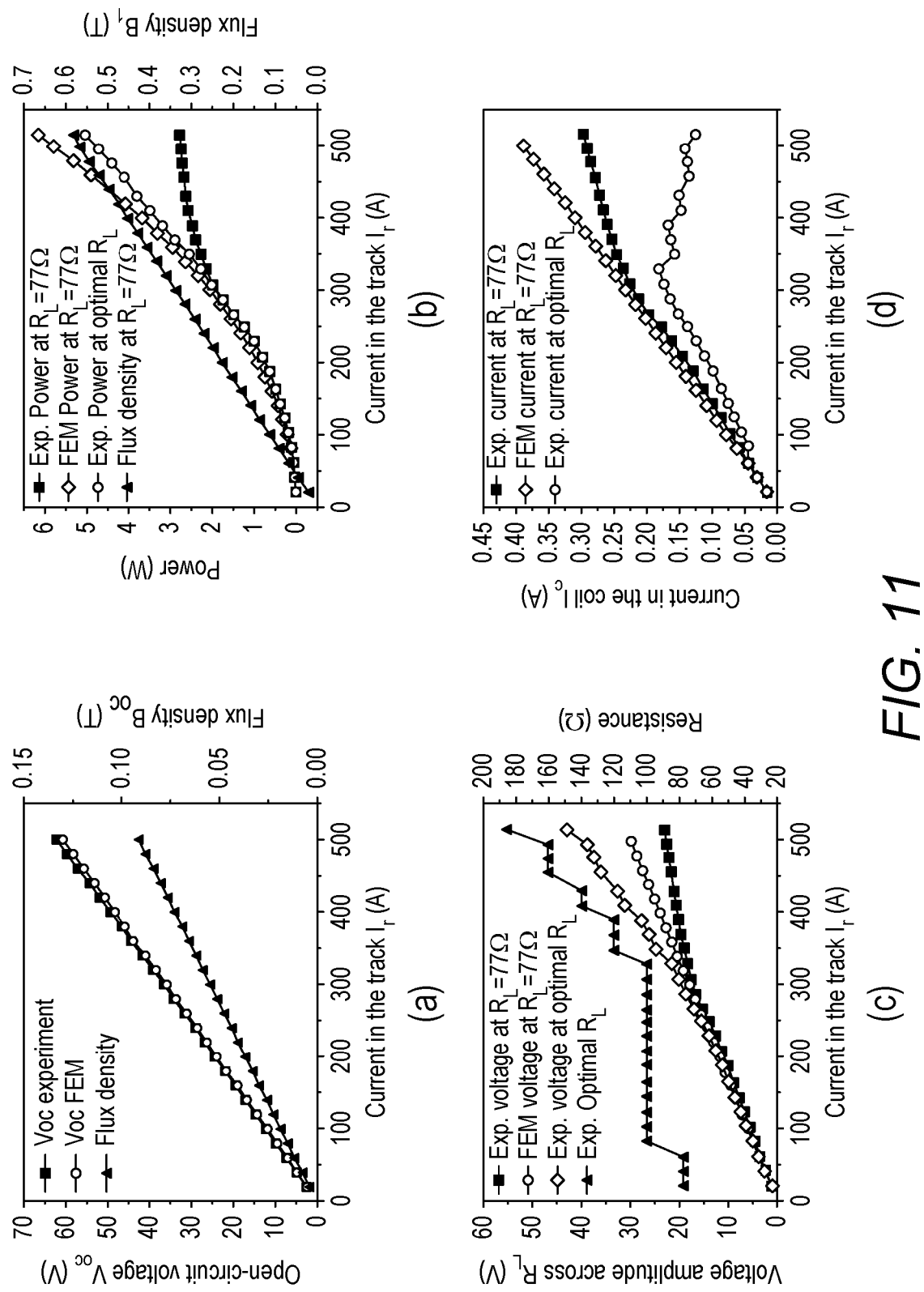
Figure 12:
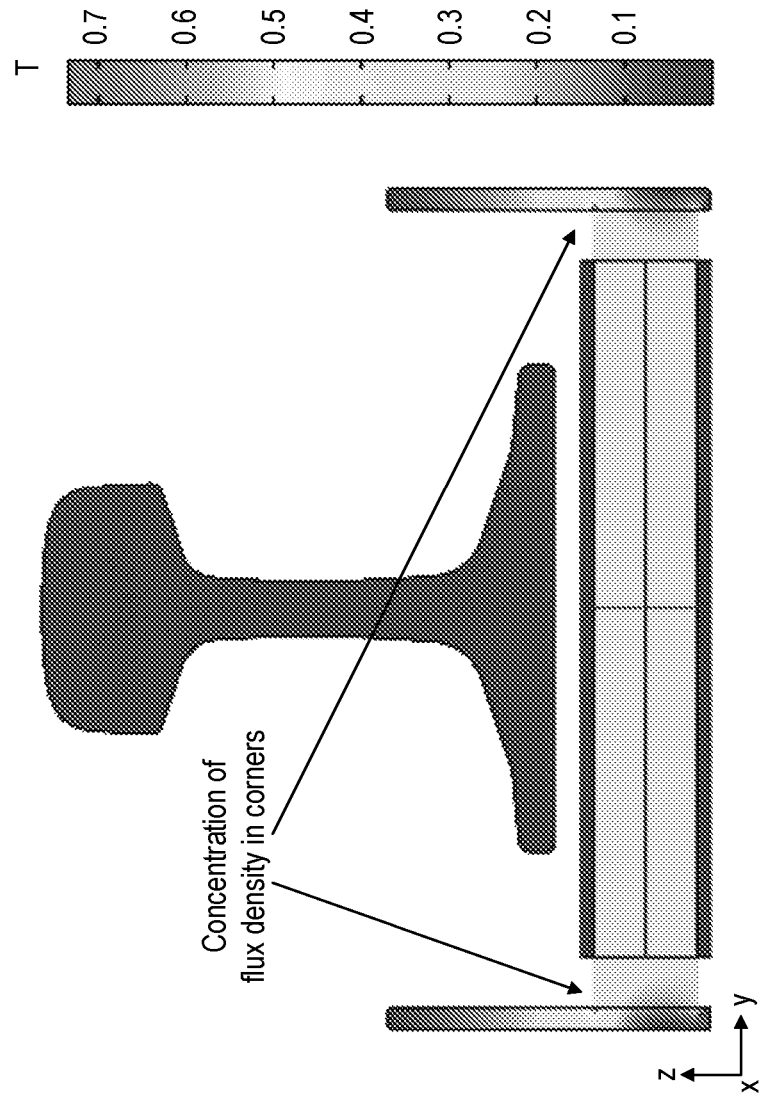
Figure 13:
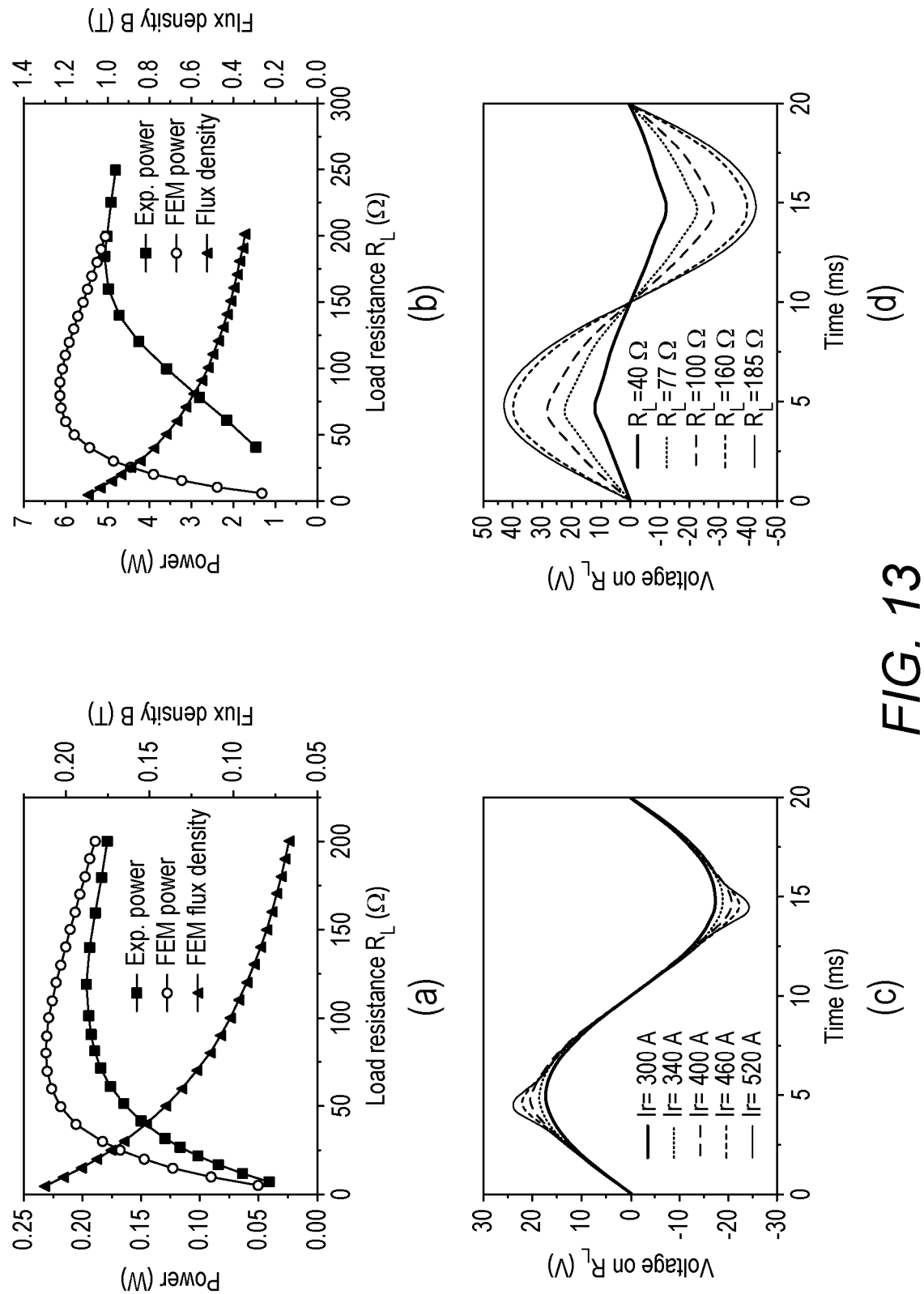
Figure 14:
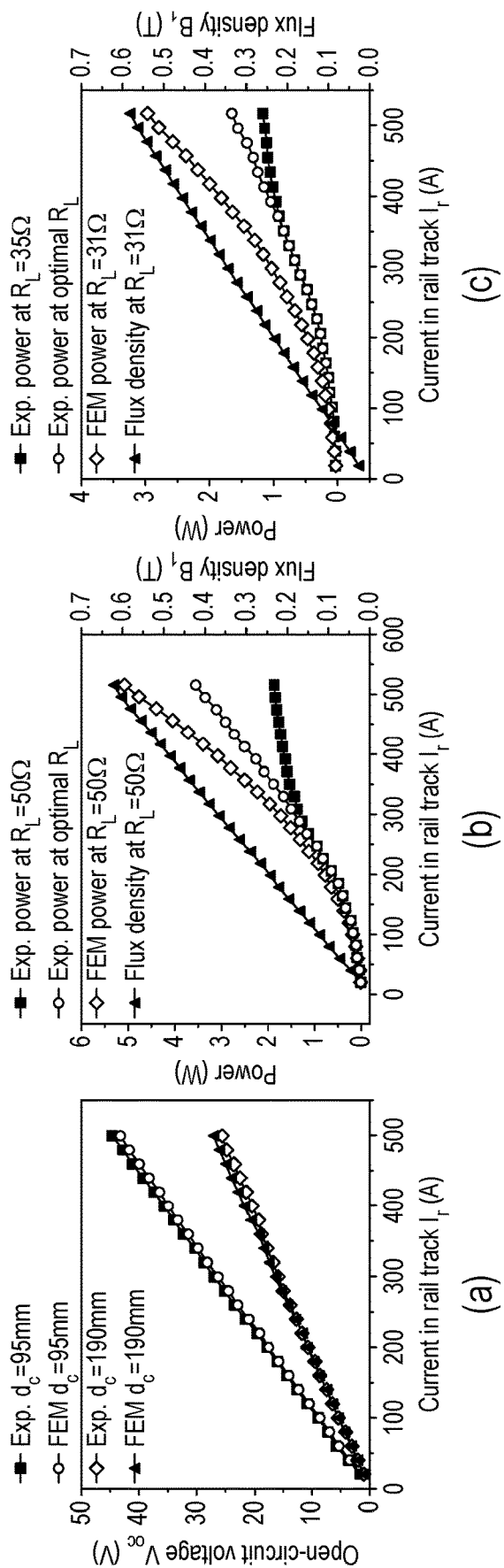
Figure 15:
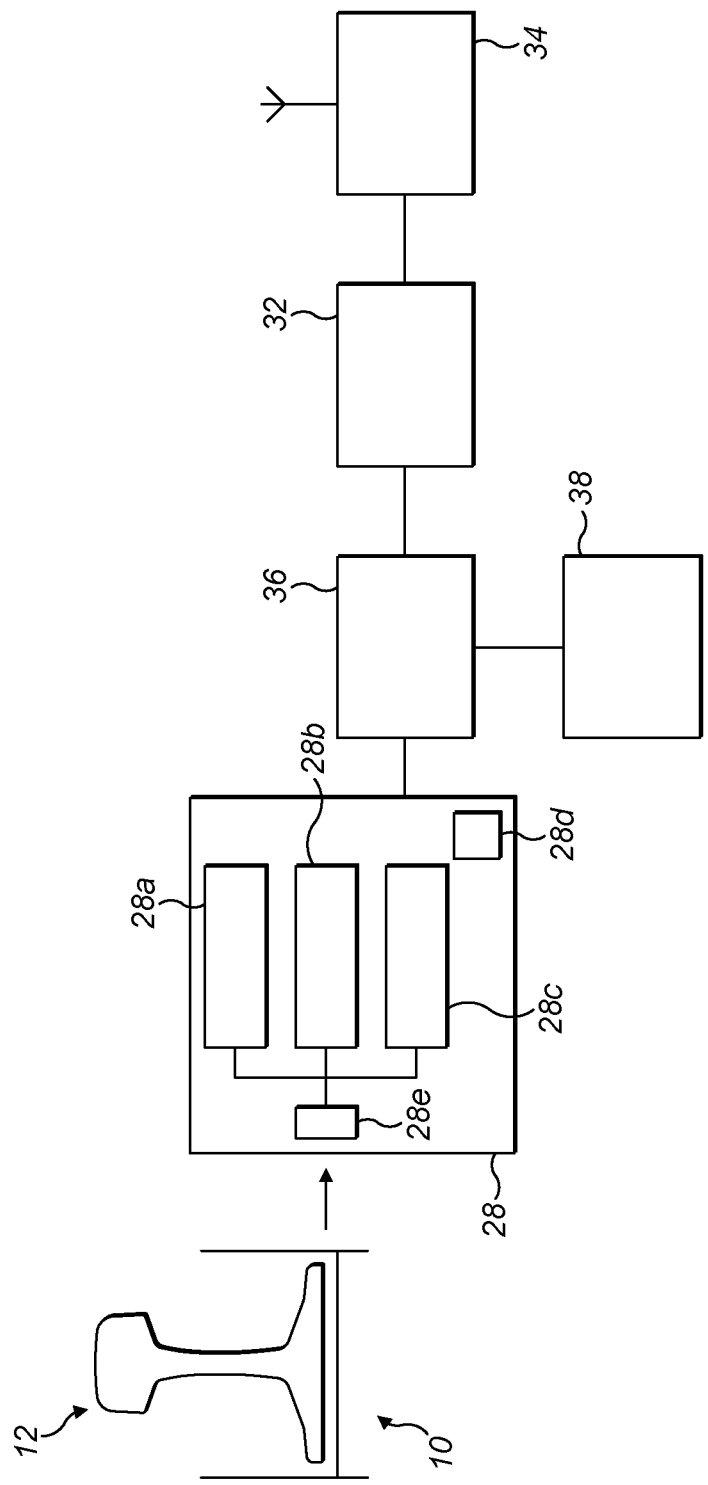
Figure 16:
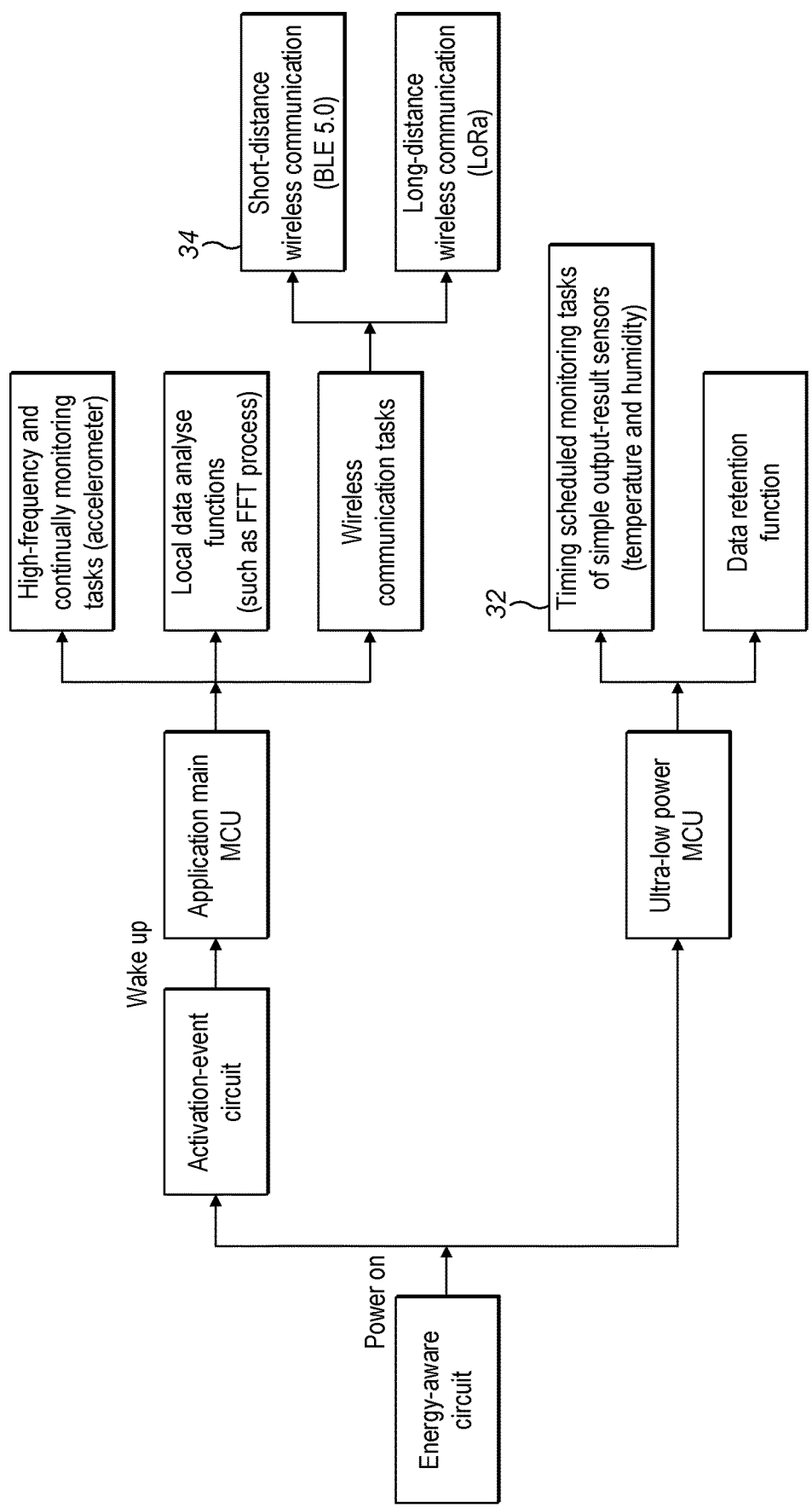
Figure 17:
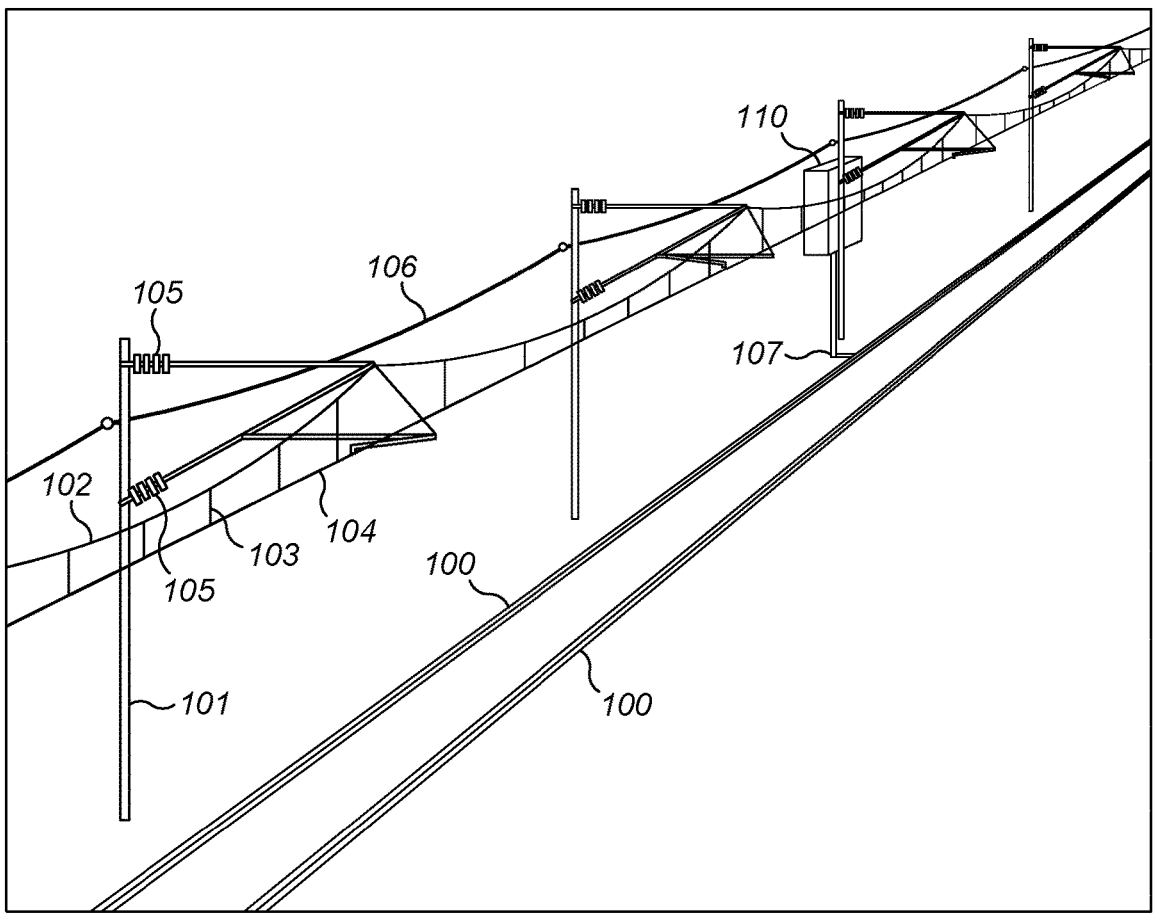
Figure 18:
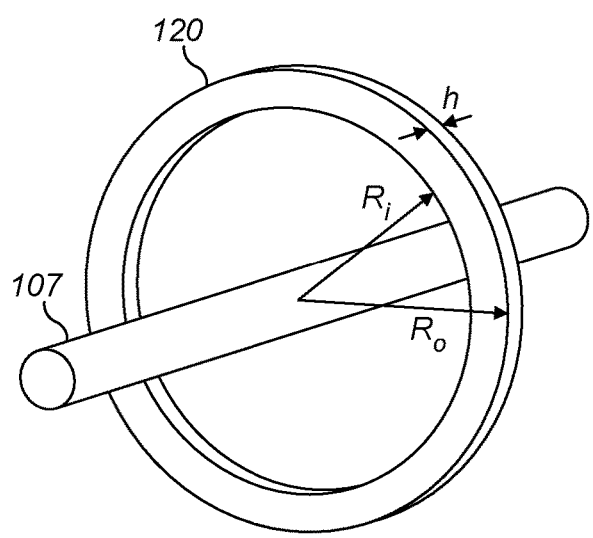
Figure 19:
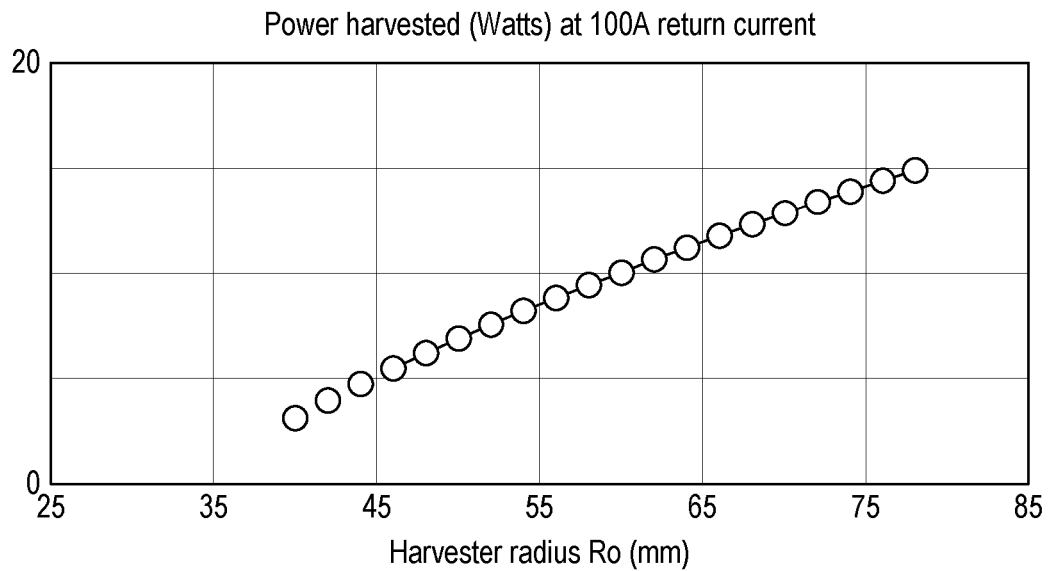
Figure 20:
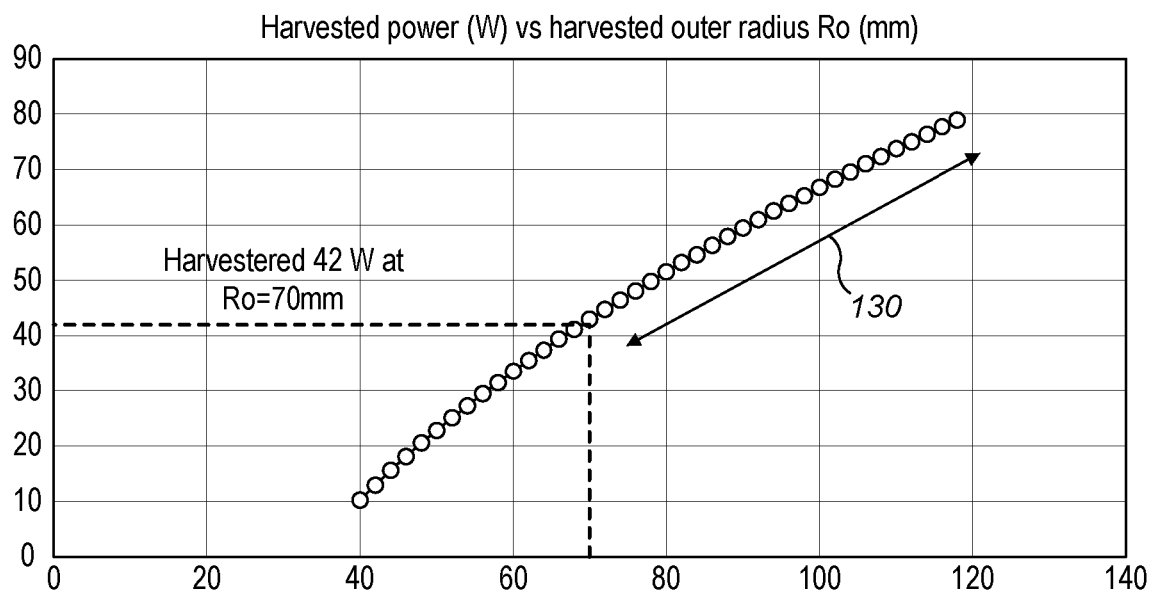

FIG. 7 Effects of the coil length $l_c$ on the flux density and eddy current density in Coil-parameter study where the coil is energised with $l_{c0}$=0.01 A and the track is not energised;

FIG. 8 illustrates the effects of the number of coil windings and relative permeability of the magnetic core on (a) the open-circuit voltage $V_{oc}$, (b) the coil resistance $R_c$, (c) the power output, and (d) flux density B;

FIG. 9 illustrates the power output of the harvester against the average flux density B in the middle of the magnetic core when the harvester is connected to the optimal load resistance;

FIG. 10 illustrates the effects of the cross-sectional area of the magnetic rod on (a) the coil resistance $R_c$ and open-circuit voltage $V_{oc}$; (b) the power output and flux density in the middle of the magnetic rod;

FIG. 11 illustrates a comparison of measured and simulated (a) open-circuit voltage $V_{oc}$ and flux density $B_{oc}$; (b) average power and flux density B; (c) voltage amplitude across the load resistance; (d) current amplitude in the coil and through the load resistance;

FIG. 12 illustrates the simulated flux density when $I_r$=300 A and $R_L$=77Ω. The average flux density in the middle of the magnetic core is 0.35 T but higher flux densities are observed in the corners;

FIG. 13 illustrates characteristics of harvester with a distance $d_c$=48 mm from the rail: effects of the load resistance $R_L$ on the power and flux density B when (a) $I_r$=100 A and (b) $I_r$=520 A; the dependence of the voltage across $R_L$ on (c) $I_r$ when R=77Ω and (d) the load resistance $R_L$ when $I_r$=520 A;

FIG. 14 illustrates the performance of the harvester placed at different distances from the rail track: (a) the open-circuit voltage; the power output and flux density when (b) $d_c$=95 mm (b) and (c) $d_c$=190 mm;

FIGS. 15 and 16 are diagrammatic representation of a rail monitoring arrangement in accordance with another embodiment of the invention and incorporating the energy harvesting arrangement of FIG. 1;

FIG. 17 shows a rail track arrangement associated with an embodiment of the present invention;

FIG. 18 shows a configuration of an energy harvester in connection with an embodiment of the present invention; and FIGS. 19 and 20 show simulation plots of the average power harvested by the embodiment of FIG. 17.

Figure 1B:
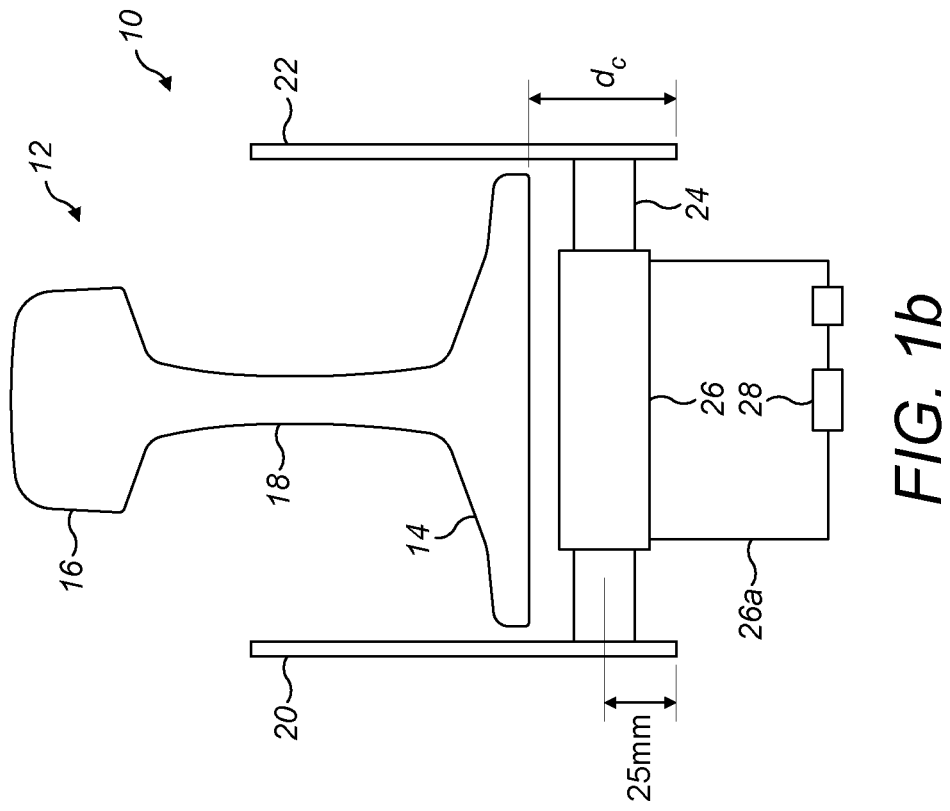

Referring firstly to FIG. 1b, an energy harvesting arrangement 10 is illustrated. The energy harvesting arrangement 10 is adapted for use in harvesting magnetic field energy arising in the vicinity of a rail 12 of a railway network when an alternating current is passing within the rail 12, the current comprising the return path of the current supplied to a train riding upon the rail 12 and used to drive the train for movement. By way of example the train may be driven using a 25 kV AC supply, and the current may be in the region of several hundred to more than 1000 A, but these parameter values will depend upon the railway network or system.

A typical rail 12, as illustrated, comprises a foot 14, a head 16, and a connecting web 18 interconnecting the foot 14 and the head 16. The head 16 is the part of the rail 12 upon which the wheels of the train run, with the flanges of the wheels located adjacent a side of the head 16. The foot 14 is typically of a greater width than the head 16 and is bolted or otherwise secured to sleepers or the like located upon ballast so that the rail 12 is supported in an upstanding condition.

The flow of an electrical alternating current within the rail 12 is predominantly at and adjacent the surface of the rail 12 as a result of the skin effect. It has been found that the current is concentrated in the outermost parts of the foot 14, adjacent the lower surface of the foot 14, and adjacent the surface of the head 16. The alternating current gives rise to the presence of a varying magnetic field adjacent these parts of the rail 12.

As shown in FIG. 1b, the harvesting arrangement 10 comprises first and second flux collectors 20, 22, interconnected with one another by means of a magnetic rod 24. The first and second flux collectors 20, 22 are each of generally square or rectangular shape and are positioned adjacent opposite sides of the rail 12 so that the foot 14 of the rail 12 is located between the first and second flux collectors 20, 22. The rod 24, in the arrangement shown is of generally cylindrical form (but it will be appreciated that the invention is not restricted in this regard and other shapes including, for example, square sections, may be used) and extends beneath the rail 12, for example at a location between adjacent ones of the sleepers. The rod 24 and first and second flux collectors 20, 22 are of a magnetic material.

A coil 26 is wound around the rod 24.

In use, as a train passes over and along the rail 12, and the return current passes into and along the rail 12, the resulting varying electrical current in the rail 12 causes a varying magnetic field which is harvested by the first and second flux collectors 20, 22, and the rod 24, and induces a current within the conductor 26a of the coil 26. The large dimensions of the first and second flux collectors 20, 22 and their proximity to the rail 12 guides an increased proportion of the magnetic field from the rail 12 into the rod 24 to induce a current in the coil 26.

As the first and second flux collectors 20, 22 are positioned adjacent the ends of the foot 14, and so are located where the magnetic flux density is high, and the rod 24 extends adjacent the lower surface of the foot 14 where, again, the flux density is relatively high, it will be appreciated that a relatively high level of electrical energy can be harvested using the harvesting arrangement. In the arrangement shown, the spacing between the first and second flux collectors 20, 22 and the ends of the foot 14 is at least 200 mm. A longer rod 24 leads to the flux collectors 20, 22 being located in regions of weaker magnetic field, but also results in a higher effective permeability and lower eddy current loss, which aids in achieving a high energy output. The length of the rod 24 is expected to be restricted, however, by the permitted size and volume of components located adjacent a railway track. Where the length of the rod 24 is restricted, it may be desired to increase the dimensions of the flux collectors 20, 22 to maintain an acceptably high output.

Figure 1A:
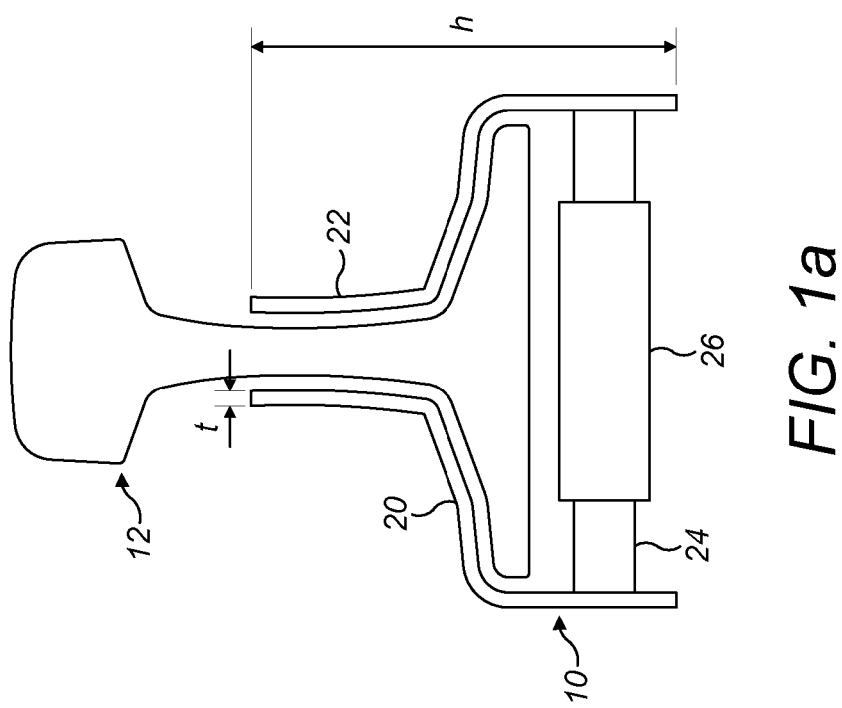

Whilst FIG. 1b illustrates a harvesting arrangement in which the flux collectors 20, 22 are of generally rectangular, substantially planar form, this need not always be the case and other shapes of flux collector may be used. By way of example, as shown in FIG. 1a, the flux collectors 20, 22 may be shaped to substantially follow the profile of the adjacent parts of the rail 12. However, it had been found that such arrangements do not perform as well as an arrangement including the simple rectangular, planar flux collectors 20, 22 shown in FIG. 1b.

The conductor 26a of the coil 26 is electrically connected, via a suitable lead, to an electrical storage device 28, for example in the form of a battery arrangement or a capacitor arrangement.

The characteristics of the above described designs for the flux collectors 20, 22 have been assessed, along with an arrangement in which no flux collectors are associated with the ends of the rod 24. In the discussion below, Design 1 is an arrangement in which no flux collectors are provided at the ends of the rod 24, Design 2 is an arrangement of the type shown in FIG. 1a with flux collectors 20, 22 shaped to generally conform with the profile of the rail 12, and Design 3 is an arrangement of the type shown in FIG. 1 with generally planar flux collectors 20, 22. In the three designs, the rod 24 has a diameter d=20 mm and length l=160 mm, the coil 26 has a length $l_c$=100 mm, the number of coil windings N=15,000 and the diameter of coil wire $d_w$=0.2 mm. The inner diameter di of the coil is the same as d. The flux collectors 20, 22 in Designs 2 and 3 have the same height h=150 mm, thickness t=5 mm and depth w=100 mm.

Figure 2:
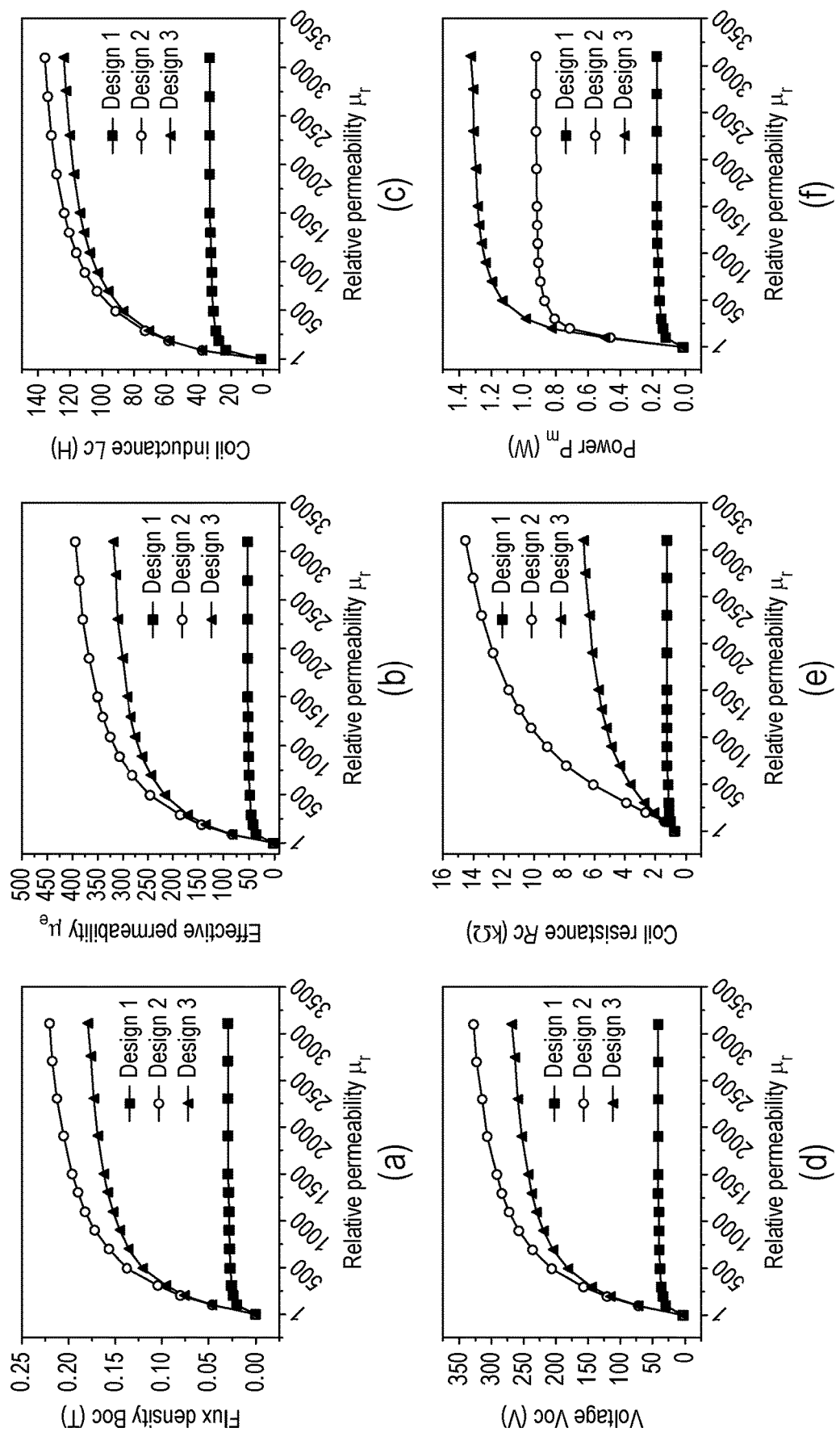
FIG. 2 is a series of graphs comparing the performances of three designs of the magnetic field energy harvester, with (a) comparing open-circuit flux density $B_{oc}$; (b) effective permeability $\mu_e$; (c) coil inductance $L_c$; (d) open-circuit voltage $V_{oc}$; (e) coil resistance $R_c$; (f) power output.

The open-circuit flux densities $B_{oc}$ in the middle of the rod are presented against the relative permeability $\mu_r$ of the magnetic core material in FIG. 2a. When $\mu_r$=1, i.e. the external magnetic field $B_{ex}$ is not intensified, $B_{oc}$ for all the three designs is $5.59 \times 10^{-4}$ T. As $\mu_r$ increases, $B_{oc}$ goes up. Both Designs 2 and 3 show much higher $B_{oc}$ than Design 1. When $\mu_r$=2000, $B_{oc}$ for Designs 1, 2 and 3 are 0.029, 0.21 and 0.17 T, respectively. The flux collectors 20, 22 guide more flux lines into the magnetic core defined by the rod 24, leading to higher flux density in Designs 2 and 3 than Design 1. Alternatively, it can be explained as the reduction of the demagnetization factor D when the flux collectors are used. The relationship between $\mu_e$ and D can be approximated as $$\mu_e \approx \mu_r/(1 + D(\mu_r - 1))$$

which suggests that because of the demagnetization factor, $\mu_e$ is always smaller than $\mu_r$ when $\mu_r$>1, which can be verified by the plot of µe against $\mu_r$ presented in FIG. 2b. $\mu_e$ was calculated by the ration of $B_{oc}$ to $B_{ex}$. Moreover, when $\mu_r$ is sufficiently large, $\mu_e$ saturates at 1/D, which in return leads to the saturation of $B_{oc}$ in FIG. 2a. Clearly, Design 2 has the highest effective permeability among the three designs.

Figure 3:
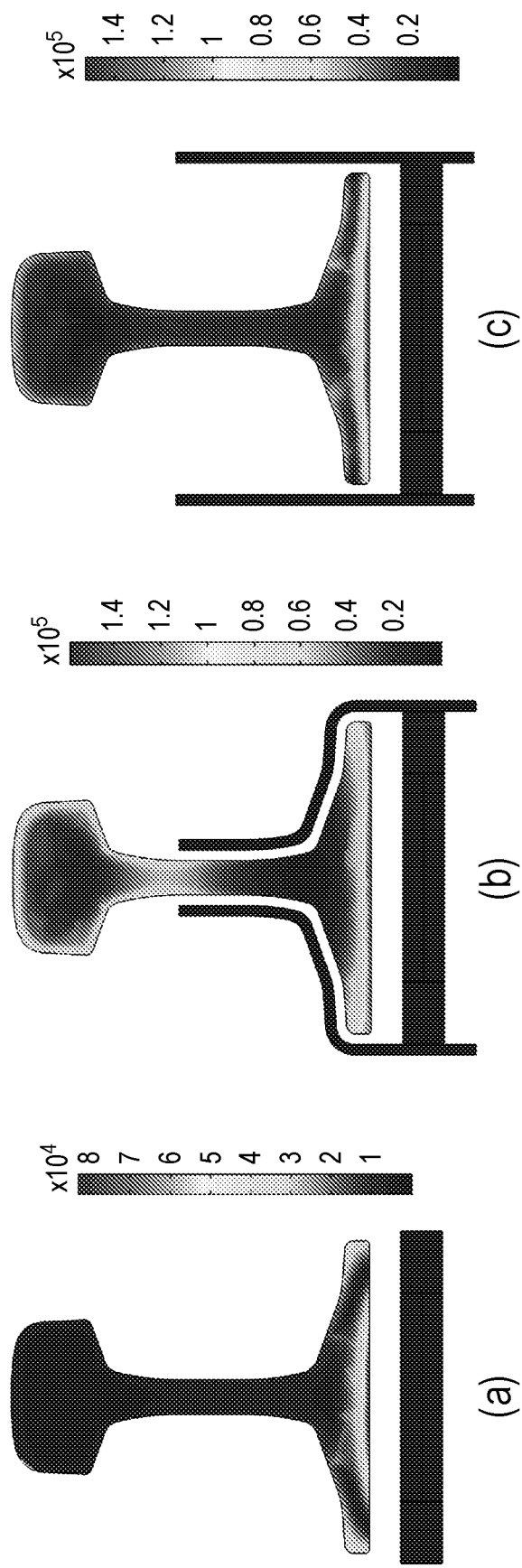
FIG. 3 illustrates the induced current density (unit A/m$^2$) when the coil is energised with $I_{co}$=0.01 A and the track is not energised, where (a) shows Design 1, (b) Design 2 and (c) Design 3, and $\mu_r$=2000 for all three designs.

The coil inductance and the open-circuit voltage for all three designs follow the same trend as $\mu_e$, because they are linearly proportional to $\mu_e$. The increase in $R_c$ with $\mu_r$, presented in FIG. 2e, is a result of the eddy current losses in the rail track. In a coil-parameter simulation, where the coil is energised but the rail track is not, eddy currents were found to be generated on the track. Design 2 has the highest eddy current density covering the largest area, followed by Design 3 and Design 1, as shown in FIG. 3. The simulated power loss $P_{ed}$ and coil resistance $R_c$ when $\mu_r$=2000 are presented in Table 1 below. The power loss $P_{ed}$ in the simulation was calculated as the volume integration of the electric loss density across the rail track. Design 2 has the highest power loss, leading to the highest $R_c$. $R_{ed}$ was calculated and compared with $R_c$-$R_w$ in Table 1, where $R_w$ is 0.65 kΩ for all three designs.

The power outputs of the three designs saturate as $\mu_r$ increases, as shown in FIG. 2f. Both Design 2 and 3 show much higher power output than Design 1, validating the benefits of the flux collectors. When $\mu_r$=2000, the power outputs of Design 1, 2 and 3 are 0.16, 0.92 and 1.30 W, respectively. Although Design 3 has a lower effective permeability, flux density and open-circuit voltage than Design 2, its power output is 41.3% higher because it induces a lower eddy current loss and thus has a lower internal resistance. Therefore, the higher effective permeability does not always lead to higher power output. Based on the power output, Design 3 was selected for the rest of this study for further study.

TABLE 1

Simulated coil losses in Coil-parameter study with $I_{c0}$ = 0.01 A

| Parameters | Design 1 | Design 2 | Design 3 |
| --- | --- | --- | --- |
| $P_{ed}$ (W) | 0.027 | 0.627 | 0.276 |
| $R_c$ (kΩ) | 1.193 | 13.202 | 6.214 |
| $R_{ed}$ (kΩ) | 0.540 | 12.540 | 5.528 |
| $R_c$-$R_w$ (kΩ) | 0.543 | 12.552 | 5.564 |

Following the optimisation on the shape of the magnetic core, simulations were performed on Design 3 with $\mu_r$=2000, $l_c$=100 mm and N=15000 to investigates the effects of the magnetic core's dimensions on the outputs. FIG. 4 shows the performance of the energy harvester against the magnetic core length l. As l is increased from 150 mm to 1150 mm, the flux density $B_{oc}$ and the voltage $V_{oc}$ first decreases and then increases. When l increases, on one hand, the magnetic flux collectors are placed further away from the rail track and thus in a weaker magnetic field, leading to a reduced number of flux lines guided into the magnetic core and the decrease in $B_{oc}$; on the other hand, the demagnetization factor of a magnetic core generally gets smaller as the ratio of l/d increases, leading to increased effective permeability. The coil resistance decreases progressively with l and then plateaus, as shown in FIG. 4b. This suggests when the flux collectors are placed away from the rail track, a lower eddy current loss is produced. Due to the decrease of the coil resistance, the power generated increases monotonously with the magnetic core length. Therefore, a longer magnetic core is preferred for higher power generation.

The dimensions of the flux collectors 20, 22 affect the power output through both the open-circuit voltage and the coil resistance, similar to the core length. For the conciseness, only the effects of these parameters on the power output are presented in FIG. 5, which shows the increase of any dimensions leads to an increase in the power output. Combining the results in FIG. 4 and FIG. 5, it can be concluded that the power output of the harvester can be increased by increasing the length of the rod 24 and the size of the flux collectors 20, 22. Therefore, the optimal dimensions are the maximum permitted by practical constraints such as installation space, device weight, and cost, and the values of l, h, w and t of 210, 100, 100 and 5 mm, respectively, have been found to achieve good results.

Figure 6:
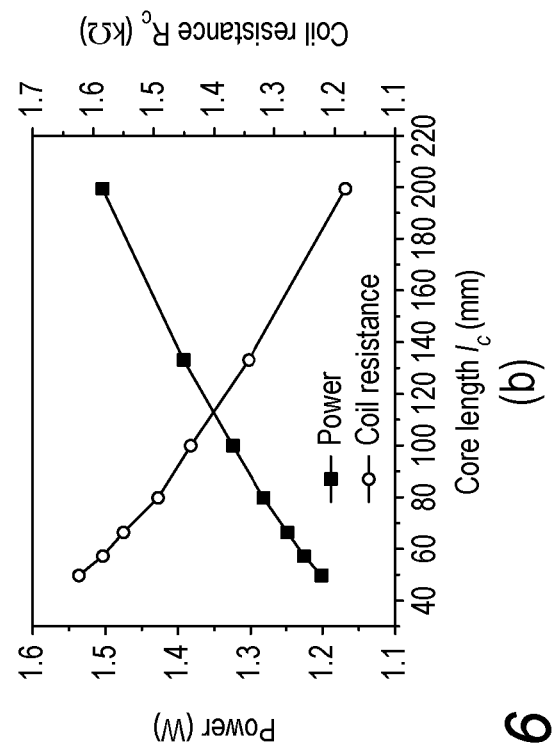
FIG. 6 illustrates the effect of the coil length $l_c$ on (a) the open-circuit voltage and magnetic flux density and (b) the power output and coil resistance of the harvester when the number of coil windings is fixed at 10,000.
Figure 6:
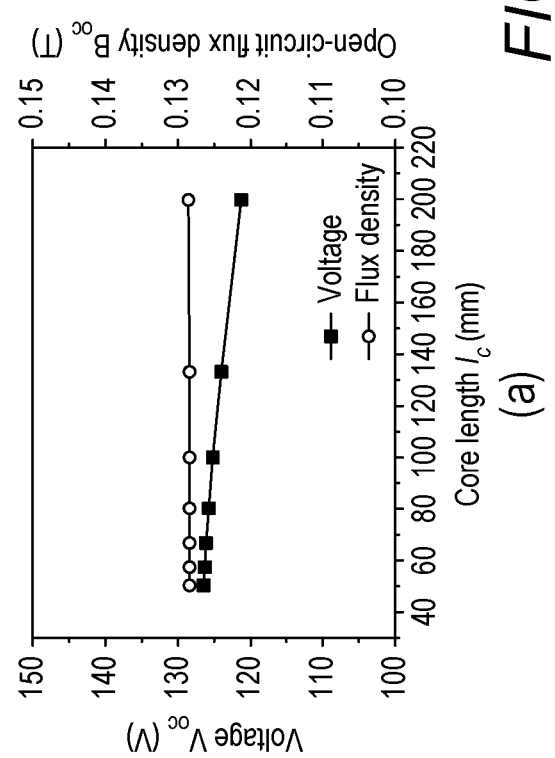

The effects of the coil length $l_c$ on the performance of the harvester are presented in FIG. 6. In all the cases, the number of windings N is kept constant at 10,000 by varying the outer diameter do by $$N = (l_c(d_o - d_i))/(2d_w^2)$$

The open-circuit flux density $B_{oc}$ does not change with $l_c$ because $B_{oc}$ is only related to the magnetic core and external magnetic field. It does not depend on the coil geometry. Although N is constant, the open-circuit voltage decreases slightly with $l_c$ because the flux density in the magnetic rod is not strictly uniform along its length—it is highest in the middle. With a smaller $l_c$, the coil is concentrated in the middle of the rod, leading to a higher EMF.

The power output is increased from 1.20 to 1.50 W because of the reduction of the coil resistance $R_c$ from 1.63 to 1.18 kΩ. When $l_c$ increases, the same number of windings requires a smaller $d_0$. This results in the decrease of the total wire length in the coil and thus the reduction in the wire resistance $R_w$. However, when $l_c$ is increased from 50 to 200 mm, $R_w$ is only reduced from 0.47 to 0.37 kΩ. Therefore, the reduction in $R_w$ is not the main cause of the reduction in $R_c$. The dominating factor for the reduction in $R_c$ is the eddy current losses. FIG. 6 shows the flux density and eddy current density in Coil-parameter studies where the coil is energised with $I_{c0}$=0.01 A and the track is not. With the same coil current, the shorter coil produces a higher flux density covering a shorter distance in the rod core. As a result, the shorter coil induces a higher eddy current density on the track. The simulated power losses $P_{ed}$ for $l_c$=50, 100 and 200 mm are 0.054, 0.052 and 0.038 W, respectively, resulting in $R_{ed}$ of 1.55, 1.45 and 1.14 kΩ. Therefore, as $l_c$ increases, the eddy current losses and $R_{ed}$ decreases, giving rise to the reduction in $R_c$. Based on the results, the coil should always be wound as long as possible.

FIG. 8 shows the effects of the number of winding layers $N_2$ and the relative permeability $\mu_r$ of the magnetic core on the performance of the harvester when $l_c$ is fixed at 200 mm. The open-circuit voltage (FIG. 8a) increases linearly with N. The coil resistance (FIG. 8b) increases rapidly with N because of the increase in both the wire resistance and the eddy current losses. The power output (FIG. 8c) first increases rapidly with N and then gradually flattens. When N is increased from 20 to 60, the maximum power is only increased from 1.8 to 2.0 W. This is because as more windings are added to the coil, the increased coil resistance gradually overshadows the increase of the open-circuit voltage, leading to little power increase eventually.

The variation pattern of $V_{oc}$, $R_c$ and P with N are almost independent of $\mu_r$. At each N, the values of $V_{oc}$, $R_c$ and P eventually saturates with $\mu_r$ because of the saturation of the effective permeability. When $\mu_r$>2000, the increase of $\mu_r$ hardly increases the power output. Based on the power output characteristics, the number of windings N is selected as 20,000 and the relative permeability of the magnetic core $\mu_r$ is selected as 2000.

The average flux density B in the middle of the magnetic core shows the same pattern as the power output, as shown in FIG. 8d. Combining FIGS. 8c and d, it can be seen that the same power output can be achieved by different combinations of $\mu_r$ and $N_2$ but the resulted B is the same. For instance, a power output of 1.2 W can be obtained by three configurations: (a) $\mu_c$=2000 and N=5000; (b) $\mu_c$=500 and N=10,000; (c) $\mu_c$=250 and N=30,000. The values of B for the three configurations are the same as 0.5 T. This is because the coil inductance is tuned out by the capacitor and the load resistance $R_L$=$R_c$<<$\omega L_c$ in all cases. As a result, the ratio between P and B is independent of N and $\mu_c$, which can be further verified by plotting the power in FIG. 8c against the corresponding B in FIG. 8d, as presented in FIG. 9. There is a clear linear relationship between P and B.

With N=20,000 and $\mu_r$=2000, the flux density B in the magnetic core is 0.7 T, which is higher than the usual magnetic saturation limit of MnZn ferrite (0.4-0.5 T). One way to reduce the flux density in the magnetic core is to increase cross-section area $A_e$ of the magnetic rod by increasing its diameter d. The effects of $A_e$ on the performance of the harvester is shown in FIG. 10. The open-circuit voltage $V_{oc}$ increases with $A_e$ but the relationship between $V_{oc}$ and $A_e$ is not linear. This is because as the diameter of the rod increases, its effective permeability $\mu_e$ decreases. The increase in $R_c$ is mainly due to the increased eddy current losses. As a result of the variation of $V_{oc}$ and $R_c$, the power output slightly decreases with $A_e$. The flux density B decreases with $A_e$. After $A_e$≥490 mm² (d≥25 mm), the flux density in the magnetic core is less than 0.5 T. Therefore, the minimum magnetic rod required for magnetic core is 25 mm.

Based on the design optimisation and the materials available, an energy harvester was prototyped, with the magnetic rod 24 made of MnZn ferrite PC40 (d=31.5 mm and l=230 mm) with initial permeability of 2300 and saturation limit of 0.51 T. The coil geometries selected were N=20,000 with wire diameter $d_w$=0.2 mm. To reduce the voltage output on the load resistance, the wire diameter was increased to 0.5 mm. When the volume of the coil is the same, the diameter of the wire affects the voltage and current distribution but does not change the power output. The coil was designed to have 3200 windings of 0.5 mm copper wire, equivalent to 20,000 windings of 0.2 mm copper wire in terms of coil volume and power generation. Due to the gaps between windings, the manufactured coil had 2798 windings. The outer diameter do and coil length $l_c$ were 40 and 200 mm, respectively. The flux collectors 22, 24 are made of MnZn ferrite plate (100×100×6 mm³, FPL100/100/6-BH1T, Kemet) with initial permeability of 3000 and a saturation limit of 0.52 T. The magnetic rod 24 and plates 22, 24 were glued together by adhesive epoxy.

Tests were then undertaken to evaluate the performance of the harvester. During the tests, the harvester was placed underneath a section of rail track 12 (1 m long). When measuring the coil resistance and inductance, the coil of the harvester was connected to a Frequency Response Analyser (PSM1700, Newton 4th). The Frequency Response Analyser energised the coil with a voltage of 1 V at 50 Hz and computed the coil resistance and inductance based on the measured voltage and current in the coil.

Before the power output measurements, a combination of multilayer ceramic capacitors with capacitances of 0.1 and 1.2 µF was connected in series to the coil. The combination of the capacitors was varied until the imaginary part of the total impedance of the coil and capacitors was minimised. Then a variable load resistance was connected in series to the capacitors and the coil. A current source (A5710-400-2V0, VX Instruments GmbH) supplied 50 Hz AC to the rail track. The current amplitude in the rail track was monitored by a current probe (Pico Technology TA 167). The voltage across the load resistor was measured to calculate the average power output.

The measured coil resistance $R_c$ and inductance $L_c$ of the fabricated device are compared with the simulation results in Table 2 with different conditions. '$d_c$=∞' means the rail track was not present during the measurement; 'solenoid' refers to the magnetic rod with the coil but without the flux collectors; 'MFEH' refers to the fully assembled harvester device. In the FEM, the MFEH and the coil were adjusted to the same as the prototype.

The FEM predicts both $R_c$ and $L_c$ of the solenoid accurately. After the flux collectors are assembled, the simulated $L_c$ is slightly higher than the measured, probably because of the air gap between the magnetic rod and flux collectors in the experiment. Overall, the simulated and measured coil parameters are in good agreement. At $d_c$=190 mm, $R_c$ and $L_c$ are about the same as $d_c$=∞, suggesting the negligible effects of the rail track and the eddy currents at this distance. As MFEH is placed closer to the rail track, increases of both $R_c$ and $L_c$ are observed. The increase in $R_c$ is resulted from the eddy current losses. The increase in $L_c$ is a combined effect of the magnetic field generated by the eddy current and the reduction in the magnetic reluctance of the magnetic core resulted from the ferromagnetic rail track. At $d_c$=48 mm, the measured $R_c$ is 71.2Ω, which is 2.5 times of that at $d_c$=∞, reflecting the importance of considering the eddy current losses for accurate modelling.

TABLE 2

Comparison of measured and simulated coil parameters

| Conditions | $R_c$ (Ω) Exp. | $R_c$ (Ω) FEM | $L_c$ (H) Exp. | $L_c$ (H) FEM | C (μF) Exp. | C (μF) FEM | Exp final impedance Ω Resistance | Exp final impedance Ω Reactance |
|---|---|---|---|---|---|---|---|---|
| Solenoid $d_c$ = ∞ | 27.2 | 26.9 | 1.19 | 1.19 | — | — | — | — |
| MFEH $d_c$ = ∞ | 27.7 | 27.1 | 2.64 | 2.80 | — | — | — | — |
| MFEH $d_c$ = 190 mm | 31.2 | 31.4 | 2.67 | 2.82 | 3.79 | 3.58 | 34.9 | 0.89 |
| MFEH $d_c$ = 95 mm | 46.5 | 50.7 | 2.78 | 2.97 | 3.61 | 3.42 | 49.87 | 0.76 |
| MFEH $d_c$ = 48 mm | 71.2 | 77.8 | 2.89 | 3.09 | 3.49 | 3.29 | 77.1 | 3.10 |

The capacitance used to tune out the coil inductance are also presented in Table 2. The final impedance is the impedance of the coil connected to the corresponding compensating capacitor. In the FEM, $L_c$ could be tuned out accurately since an arbitrary capacitance can be specified. Therefore, the final impedance in the FEM is purely resistive with its resistance the same as $R_c$ and is not presented. In the experiments, the accuracy of the tuning was limited by the capacitors available and as a result, the final impedance still has a small reactive part, as shown in Table 2. The resistance is increased slightly from $R_c$ due to the resistive component of the capacitors.

At $d_c$=48 mm, the measured open-circuit voltage $V_{oc}$ agrees well with the simulated, as shown in FIG. 11a. $V_{oc}$ increases linearly with the current $I_r$ in the rail track. This is because the magnetic field generated by the rail track increases linearly with Ir, which can be verified by the linear relationship between $B_{oc}$ and $I_r$.

The measured average power, zero-peak amplitudes of load voltage and current are compared with the simulation results in FIG. 11b to d. In the FEM, the load resistance $R_L$ was kept constant at the coil resistance $R_c$=77Ω since $R_c$ is always the optimal load resistance. The simulated load voltage and current increases linearly with $I_r$ and the simulated power increases proportionally to $I_r^2$, as expected. In the experiments, when $R_L$=77Ω, the measured power first increases rapidly with Ir and then flattens gradually after $I_r$>~300 A. The flattening of the power is caused by the decreasing permeability due to the nonlinear magnetization and magnetic saturation of the magnetic core when the flux density is increased. The simulated average flux density B increases linearly with $I_r$, as shown in FIG. 11b. At $I_r$=300 A, B is as high as 0.35 T, leading to the nonlinear magnetization in the experiment. Moreover, high flux densities (>0.51 T) are concentrated in the corners, as shown in FIG. 12, leading to the magnetic saturation in those locations. The nonlinear magnetization and magnetic saturation in the experiment lead to a reduced increasing speed of the voltage amplitudes with $I_r$, as shown in FIG. 11c, and distortions in the voltage waveform, as shown in FIG. 13c. The slow increase in voltage amplitude and the distortions in the voltage waveform results in little power increase with $I_r$ after $I_r$>300 A.

To fully test the power characteristics, at each value of $I_r$, the load resistance $R_L$ in the tests was varied until the optimal load resistance yielding the maximum power was obtained. The measured power with the optimal $R_L$ is presented in FIG. 11a, where a better match between simulation and experiment is observed up to $I_r$=520 A. The measured optimal load resistance (FIG. 11b) was found to increase with the $I_r$. When $I_r$=100 A, the optimal load resistance is 100Ω, instead of the coil resistance of 77Ω, which can be verified by the power against $R_L$ plot in FIG. 13a. When $I_r$=520 A, the optimal load resistance is increased to 185Ω (FIG. 13b). The increase of the optimal load resistance is partly because of the increased loss, e.g. hysteresis loss, of the magnetic core as the flux density increases. It is also caused by the fact that the increase of the load resistance results in a reduced flux density. The flux density B in the magnetic core decreases monotonically with $R_L$, as shown in FIGS. 13a and b. The reduction in the flux density reduces the negative effects of the high flux density, potentially leading to increased power output. This can be validated by the voltage measured on different load resistances when $I_r$ is kept constant at 520 A, as presented in FIG. 13d. When $R_L$=40Ω, the measured load voltage is significantly distorted from a sinusoidal wave because of the magnetic saturation. The simulated flux density B (FIG. 13b) in such a condition exceeds the saturation limit (0.51 T). As $R_L$ increases, the distortions are gradually reduced, leading to an increase of power with $R_L$ (FIG. 13b). When $R_L$=185Ω, the distortion disappears and the maximum power of 5.05 W is produced. Despite the increased optimal load resistance, the measured maximum power is only 17.8% down from the simulated power of 6.15 W. This is with attributed to the slow decrease of the power RL when RL is increased beyond the optimal value.

As the distance de increases, the open-circuit voltage decreases, as shown in FIG. 14a, because the magnetic field generated by the rail track decreases with the distance to itself. The measured power outputs when $d_c$=95 and 190 mm are compared with simulation in FIGS. 14 b and c. The characteristics of the measured power output are similar to that of $d_c$=48 mm. When the load resistance $R_L$ equals to the coil resistance, the power output gradually flattens with $I_r$. A higher power output can be generated by increasing the load resistance beyond the coil resistance. At $I_r$=520 A, the maximum power measured in the experiment is 3.5 and 1.6 W for $d_c$=95 and 190 mm, respectively, corresponding to 69.3% and 31.7% of the power generated at $d_c$=48 mm. Although the harvester generates lower power with a larger $d_c$, the simulated flux density in the magnetic core is about the same for the three $d_c$, as can be seen from FIG. 11b and FIGS. 14 b and c. The flux densities B for $d_c$=48, 95 and 190 mm at $I_r$=300 A are 0.34, 0.35 and 0.34 T, respectively. This explains that when $d_c$=95 mm, the measured power with $R_L$=50Ω starts to flatten at about the same $I_r$ (300 A) as $d_c$=48 mm. The measured power when $d_c$=190 mm starts to flatten at a higher value of $I_r$ (~380 A) because the discrepancy between the measured and simulated power is larger than the other two distances.

As described hereinbefore, a magnetic field energy harvester with multi-watts power is provided in accordance with the invention, designed, optimised and tested for energy harvesting from the magnetic field energy generated by the traction return currents in rail tracks. The harvester is simple in structure and easy to fabricate. Compared with energy harvesting from wind, thermal and mechanical sources around rail tracks, the magnetic field energy is not affected by weather conditions and the harvester is free of mechanical fatigue and offers longevity. These advantages together with the higher power output make the harvester a promising energy supply to wireless sensors networks for rail track condition monitoring.

The design and optimisation were carried out in electromagnetic-circuit coupled finite element model, which included the effects of the eddy current generation in the rail track. The design parameters investigated included the shape, dimensions and magnetic permeability of the magnetic core, the length and number of windings of the coil and the load-dependent flux density in the magnetic core. The flux collectors can increase the effective permeability by guiding more flux lines into the magnetic core and reducing the demagnetization effect. As a result, the power output is increased compared with the magnetic core without flux collectors. However, flux collectors leading to higher effective permeability do not always bring a higher power because of the increased eddy current losses. Increasing the permeability $\mu_r$ of the magnetic core material leads to increased power in the beginning but the effect gradually diminishes when $\mu_r$ is large enough because of the saturation of the effective permeability. The power output of the harvester can be improved by increasing the length of the magnetic rod and the size of the flux collectors. The coil length should be as long as possible to reduce the coil resistance and increase the power output. When the total number of windings increases, the power output first increases rapidly and then gradually flattens due to the increased coil resistance resulted from the increased wire length and eddy current losses. The increase in the cross-section area of the magnetic rod reduces the flux density significantly while reducing the power slightly, and therefore can be used to prevent magnetic saturation.

Test results have shown good agreement with simulation results. An increase in the optimal load resistance was observed in the experiment because of the nonlinear magnetization and magnetic saturation of the magnetic core. This was also caused by the fact that the increase in the load resistance reduces the flux density and therefore reduce the negative effects of nonlinear magnetization and magnetic saturation, leading to an increase in power generation. Placing the harvester further away from the rail track reduced the eddy current loss but also reduced the power output. When the harvester was moved from a distance of 48 mm to 190 mm where the eddy current loss is negligible, the power output was reduced from 5.05 to 1.6 W.

Figure 1C:
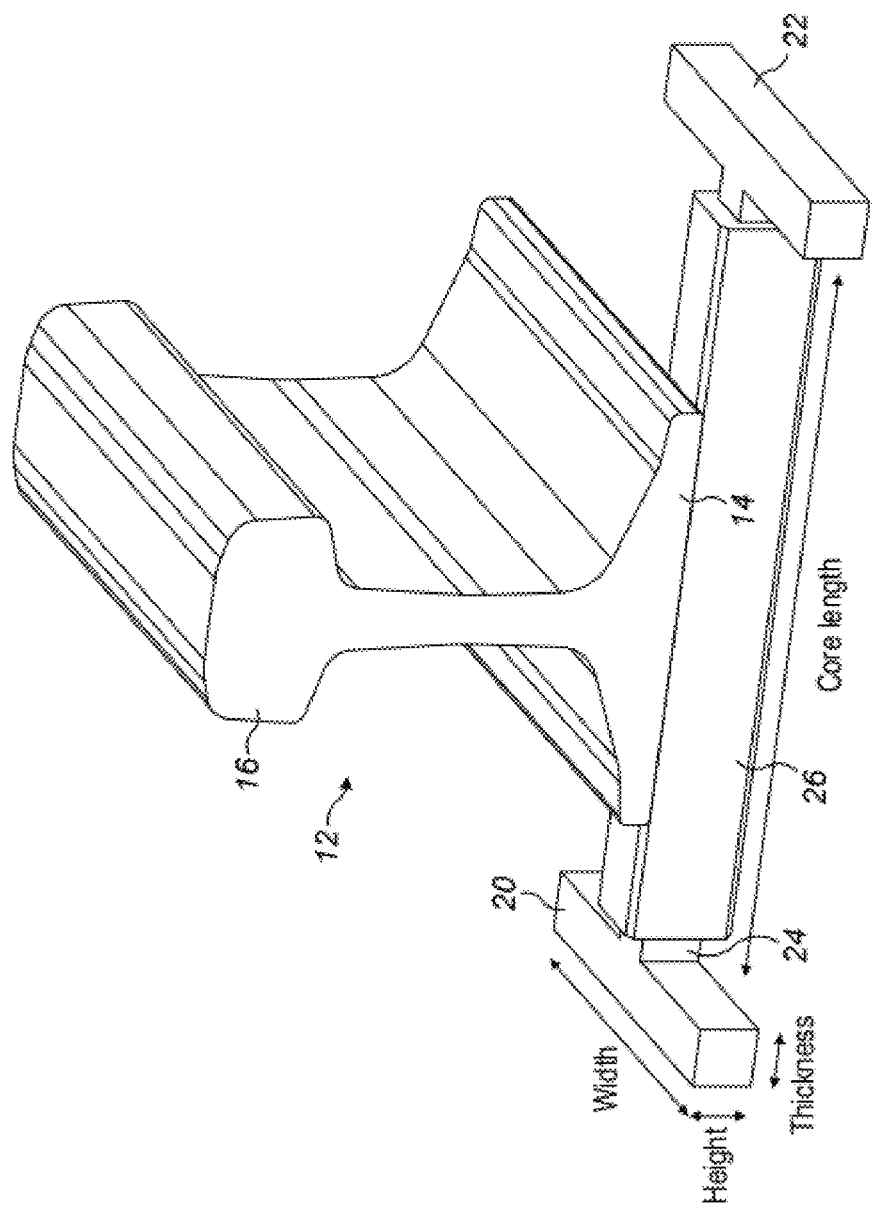

In the arrangements described hereinbefore, the flux collectors 20, 22 project to a height such that part of the foot 14 of the rail 12 is located between the flux collectors 20, 22. In some applications, such location of the flux collectors 20, 22 may not be permitted and FIG. 1c illustrates an alternative embodiment in which the flux collectors 20, 22, along with the rod 24, are located entirely below the level of the bottom of the foot 14. As such an arrangement may be less efficient than, for example, the arrangement of FIG. 1, the flux collectors 20, 22 may be of increased dimensions (increased width and thickness) to compensate for the reduced efficiency and reduced height thereby still allow the generation of a desired power output. The flux collectors 20, 22, rod 24 and coil 26 may conveniently be located within a housing, for example of a suitable plastics material, that may also house other parts of the associated circuit, the housing being positioned beneath the rail 12 so as to position the flux collectors 20, 22 to opposite sides of the rail 12 with the rod 24 extending beneath the full width of the foot 14 of the rail 12. It is envisaged that the housing may be of dimensions in the region of 60 mm tall by 360 mm wide and 190 mm depth. The rod 24 is of length in the region of 260 mm. The flux collectors 20, 22 are conveniently of a laminated magnetic steel material.

FIG. 15 illustrates, diagrammatically a rail monitoring arrangement 30 for use in monitoring the condition of the rail 12, the rail monitoring arrangement 30 incorporating the harvesting arrangement 10 described hereinbefore. As shown in FIG. 15, the rail monitoring arrangement 30 comprises a sensor 32 sensitive to a parameter indicative of a rail condition. By way of example, the sensor 32 may be sensitive to temperature, humidity, accelerations or vibrations associated with the rail and/or other parameters. Whilst the sensor 32 could be sensitive to a single parameter, the sensor 32 preferably includes a series of separate detectors sensitive to different parameters, and so the output of the sensor 32 may include data or information indicative of a range of different parameter values relating to the rail condition.

Associated with the sensor 32 is a transmission arrangement 34 operable to transmit data representative of the sensor output to a remote location. By way of example, the transmission arrangement 34 may comprise a Bluetooth communications link (where the transmission distance is to be fairly short) or a LoRa (where a greater transmission distance is required) whereby the data can be transmitted to a communications hub with which several similar arrangements 30 are in communication. The communications hub may, in turn, transmit the data to a remote monitoring station where the data may be stored and used to assess rail conditions and put in hand any required maintenance or servicing actions as may be required in response to the sensed conditions. The functions of the sensor 32 and transmission arrangement 34 and associated circuits are illustrated, diagrammatically in the block diagram of FIG. 16.

The rail monitoring arrangement 30 further comprises a controller 36 operable to control the operation of the sensor 32 and the transmission arrangement 34. Preferably, a sensor 38 sensitive to the approach of a train along the rail 12 is associated with the controller 36. The sensor 38 could comprise, for example, a suitable passive piezoelectric transducer, a microphone or a vibration sensor. In use, the sensor 32 and transmission arrangement 34 conveniently normally occupy a low power standby condition. Upon detection, by the sensor 38, that a train is approaching, the controller 36 conveniently operates to fully power up the sensor 32 and transmission arrangement 34 to a fully operative condition during which the sensor 32 operates to detect rail condition parameter values, and the transmission arrangement 34 operates to transmit the sensor output data to the communications hub or the like. After a predetermined time, or after it is detected that the train has passed, the controller 36 operates to return the sensor 32 and transmission arrangement 34 to the low power, standby condition.

The controller 36, sensor 32 and transmission arrangement 34 are powered from the electrical storage device 28. Preferably, as illustrated, the electrical storage device 28 includes several, in this case three, stores 28a, 28b, 28c, each of which takes the form of a capacitor or the like, a power converter 28e to convert the coil output to a useable form, and a power management module 28d (which may form part of the controller 36) operable to control charging and discharging of the stores 28a, 28b, 28c.

In use, at times during which the output of the sensor 38 indicates that there is no train approaching or passing the monitoring arrangement 30, there will be no or minimal magnetic energy to be harvested and the output of the coil 26 will be zero. When the sensor 38 provides an output to indicate that there is a train approaching, then one or other of the first and second stores 28a, 28b is disconnected from the coil 26 and is instead connected to supply power to the sensor 32 and transmission arrangement 34 so that they can operate as set out hereinbefore. The other of the first and second stores 28a, 28b remains connected to the coil 26 so that charging thereof can continue, unless full in which case charging of the third store 28c can take place.

Conveniently, the first and second stores 28a, 28b are used in turn to power the sensor 32 and transmission arrangement 34. In this manner, the store 28a, 28b with least charge will be the one that is charged, and the one with most charge will be used to power the sensor 32 and transmission arrangement 34. If desired, using suitable detectors, the system may be configured so as always to use the store 28a, 28b that has most charge to power the sensor 32 and transmission arrangement 34.

The third store 28c may be used in the event of an anomaly being detected.

It will be appreciated that such an arrangement is advantageous in that simultaneous charging and discharging of the stores 28a, 28b can be avoided, and that sufficient power can be stored to enable powering up of the sensor 32 and transmission arrangement 34 before the train has reached the part of the rail 12 at which the monitoring arrangement is installed. As the peak level of energy harvesting will be achieved as the locomotive or the like passes that part of the rail 12, it will be appreciated that the role of the power management module 28d is important in ensuring that the sensor 32 and transmission arrangement 34 can be powered up before the peak level of energy harvesting is achieved. By placing the sensor 32 and transmission arrangement 34 into a standby mode when no train is passing, it will be appreciated that the power requirements of the arrangement 30 are relatively small and can readily be met by the harvesting arrangement 10.

In a further embodiment of the present invention, energy is harvested from another point in the rail arrangement. The previously described embodiment provides an energy harvester which is located proximal to the rail itself and is able to harvest energy, as described. In this embodiment, energy is harvested from a return wire, which is electrically connected to the rail and which provides a return path to a booster transformer, which is provided at the trackside. In practice, in certain rail configurations, a plurality of such booster transformers are provided and are dispersed periodically along the track at intervals. Such an arrangement is illustrated in FIG. 17. This shows a rail line 100 and associated apparatus.

Alongside the track there are periodic masts 101, which support and elevate various cables above the rail line 100. The various lines are insulated from the mast 100 by one or more insulators 105. Power is carried in a catenary wire 102. This is provided with a plurality of droppers 103, which are short cables which connect the catenary wire 102 with a contact wire 104. The contact wire provides the means by which a train can receive power from the system via its pantograph arrangement.

On railway lines equipped with an AC overhead catenary 102, special precautions may be taken to reduce interference in nearby communications cables (not shown). If a communications cable is laid alongside rails 100 carrying the return current of the overhead line supply, it can have unequal voltages induced in it. Over long distances these unequal voltages can represent a safety hazard. To address this problem, many rail systems use booster transformers 110. These are positioned on some of the masts 101 at intervals along the route. They are connected to the main power feeder station by a return conductor cable 106 hung from the masts so that it is roughly the same distance from the track as the catenary line 102. The return conductor 106 is connected to the running rail 100 at intervals, to parallel the return cable 106 and rails 100. The effect of this arrangement is to reduce the noise levels in the communications cable and ensure the voltages remain at a safe level. Such an arrangement is commonly used in rail systems.

In order to connect the running rails 100 to the booster transformer 110, periodic electrical connections 107 are made from the rail 100 to the booster transformer 110. Such connections 107 are in the form of an electrical cable which is electrically connected to the rail 100 and then is fastened to a lower portion of the mast 101 supporting the booster transformer 110.

The return connection 107 provides a further source from which energy may be harvested. As described in relation to the previous embodiment, when a train passes, there is a current flowing in the rails 100 and then in the return connection 107.

FIG. 18 illustrates schematically an arrangement which may be used to harvest the energy associated with this current flow. A coil 120 is placed around the return connection 107 and magnetic flux associated with current flowing the wire 107 induces a current in the coil, which may be harvested in a similar manner to that described previously.

FIG. 18 shows certain parameters which may be varied in this embodiment. These include the inner radius Ri of the coil 120, the outer radius R0 of coil 120 and the thickness h of the coil 120. Other parameters which may be varied include the number N of coil windings and the permeability μr.

FIG. 19 shows simulation results for various values of Ro for a typical return current of 100 A flowing in wire 107. In this simulation h=30 mm and Ri=33 mm. This shows that approximately 5-15 W of average power can be harvested with Ro in the range 45-75 mm, as shown. It is further found that If h increases to 60 mm or 90 mm, the harvested power can be 10-30 W and 15-45 W respectively.

FIG. 20 shows a further simulation plot showing harvester power against Ro. The example shows a power of 42 W when Ro=70 mm. However, arrow 130 indicates that more power may be harvested if Ro is increased. For instance, if Ro=120 mm, then 80 W may be possible. This plot assumes a return current of 100 A in wire 107, Ri=33 mm, h=100 mm and μr=3500 (Silicon steel).

It can be seen from the above that selection of suitable parameters for the coil 120 can result in the harvesting of relatively large amounts of energy. One harvester arrangement is able to deliver more than 40 W. If the parameters are further adjusted as shown in FIG. 20, then 80 W may be achievable.

In the case of a lower return current of e.g. 80 A, then the harvested power may be in the region of 50 W when Ri=33 mm, Ro=120 mm and h=100 mm.

Note that FIG. 18 shows the coil 120 completely surrounding the return connection 107, such that the return connection cable 107 passes through the coil. In practice, of course, there are other arrangements possible. The only requirement is that the coil 120 is positioned sufficiently close to the return cable for a current to be induced therein. The arrangement shown is FIG. 18 is the preferred, but not the only, option.

Note also that in configurations which do not use a booster transformer, the rails 100 may be periodically grounded directly by means of a cable connected to a ground spike, or similar. In such circumstances, the cable referred to acts as the return connection cable and can be used in place of the cable 107 connected between the rails 100 and the booster transformer 110, referred to previously.

As with the previous embodiment, the power harvested should be stored for future activities. The description provided earlier in relation to storage of the captured energy applies equally to the embodiment shown in FIG. 18.

Whilst the description hereinbefore relates to specific designs of energy harvesting arrangement and rail monitoring arrangement, it will be appreciated that a wide range of modifications and alterations may be made thereto without departing from the scope of the invention as defined by the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An energy harvesting arrangement for use in the harvesting of magnetic field energy from a source in the form of a rail of a railway network, the energy harvesting arrangement comprising an energy harvester arranged in proximity to the rail or a component electrically connected to the rail, and the energy harvester is electrically connected, via a power management circuit, to an electrical storage device, wherein the energy harvester comprises first and second flux collectors positioned, in use, adjacent opposite sides of a foot of the rail so that the foot of the rail is located, at least in part, laterally between the first and second flux collectors, the first and second flux collectors being interconnected by a rod around which a coil is wound, the rod extending beneath the rail, the conductor of the coil being electrically connected, via the power management circuit, to the electrical storage device, wherein the first and second flux collectors and the rod are of a magnetic material.

2. An arrangement according to claim 1, wherein the flux collectors are of substantially planar form.

3. An arrangement according to claim 1, wherein the flux collectors are located close to, but spaced from, the rail.

4. An arrangement according to claim 1, wherein the flux collectors are located, in their entirety, below the level of the bottom of the foot of the rail.

5. An arrangement according to claim 1, wherein the flux collectors are of generally square cross-sectional shape.

6. An arrangement according to claim 1, wherein the flux collectors and the rod are located within a housing positioned beneath the rail.

7. The arrangement of claim 1 wherein the energy harvester comprises an additional coil arranged in proximity to a return wire, the return wire is either: connected from the rail to a booster transformer located alongside the rail; or connected from the rail to ground, and the additional coil is electrically connected, via the power management circuit, to the electrical storage device.

8. The arrangement of claim 7 wherein the additional coil is arranged to surround the return wire.

9. A rail monitoring arrangement for monitoring the condition of a rail, the rail monitoring arrangement comprising an energy harvesting arrangement according to claim 1, a sensor operable to monitor a condition parameter associated with the rail, the sensor being arranged to be powered from the electrical storage device, a transmission arrangement whereby data acquired using the sensor can be transmitted to a remote location, and a controller operable to control the operation of the sensor and the transmission arrangement.

10. An arrangement according to claim 9, wherein the electrical storage device includes at least a first energy store and a second energy store, and the controller includes a power management function operable to connect one of the energy stores to the coil, and the other of the energy stores to the sensor and transmission arrangement.

11. An arrangement according to claim 10, wherein the controller connects the energy store with the highest level of charge to the sensor and transmission arrangement, and the energy store with the lowest level of charge to the coil.

12. An arrangement according to claim 10, wherein the energy stores are connected, in turn, to the sensor and transmission arrangement.

13. An arrangement according to claim 10, and further comprising a sensor operable to detect an approaching train.

14. An arrangement according to claim 13, wherein the sensor comprises a piezoelectric sensor, a microphone or a vibration sensor.

15. An arrangement according to claim 14, wherein upon detection of the approaching train, the controller powers up the sensor and transmission arrangement to allow sensor information to be recorded and transmitted to a remote location.

16. An arrangement according to claim 15, wherein the sensor information is transmitted via a Bluetooth communications link to a communications hub forming the remote location.

\* \* \* \* \*